April 28, 1959   A. D. PAXTON ET AL   2,883,914
METHOD AND APPARATUS FOR MAKING PAPER PLANT COVERS
Filed Aug. 1, 1956   11 Sheets-Sheet 1

ALLEN D. PAXTON
FRED S. SMITH
CHARLES H. JOHNSON
INVENTORS.

BY
ATTORNEY.

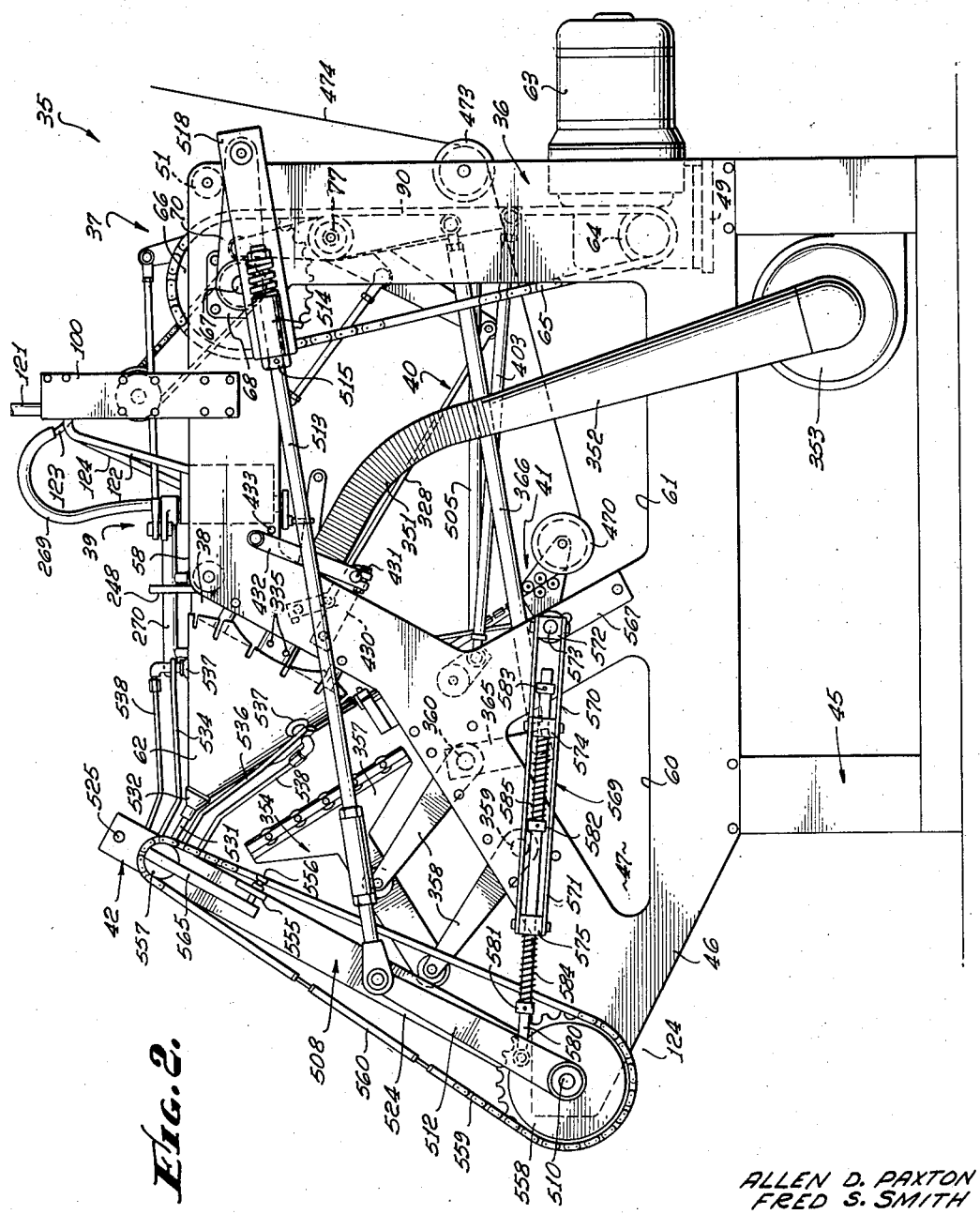

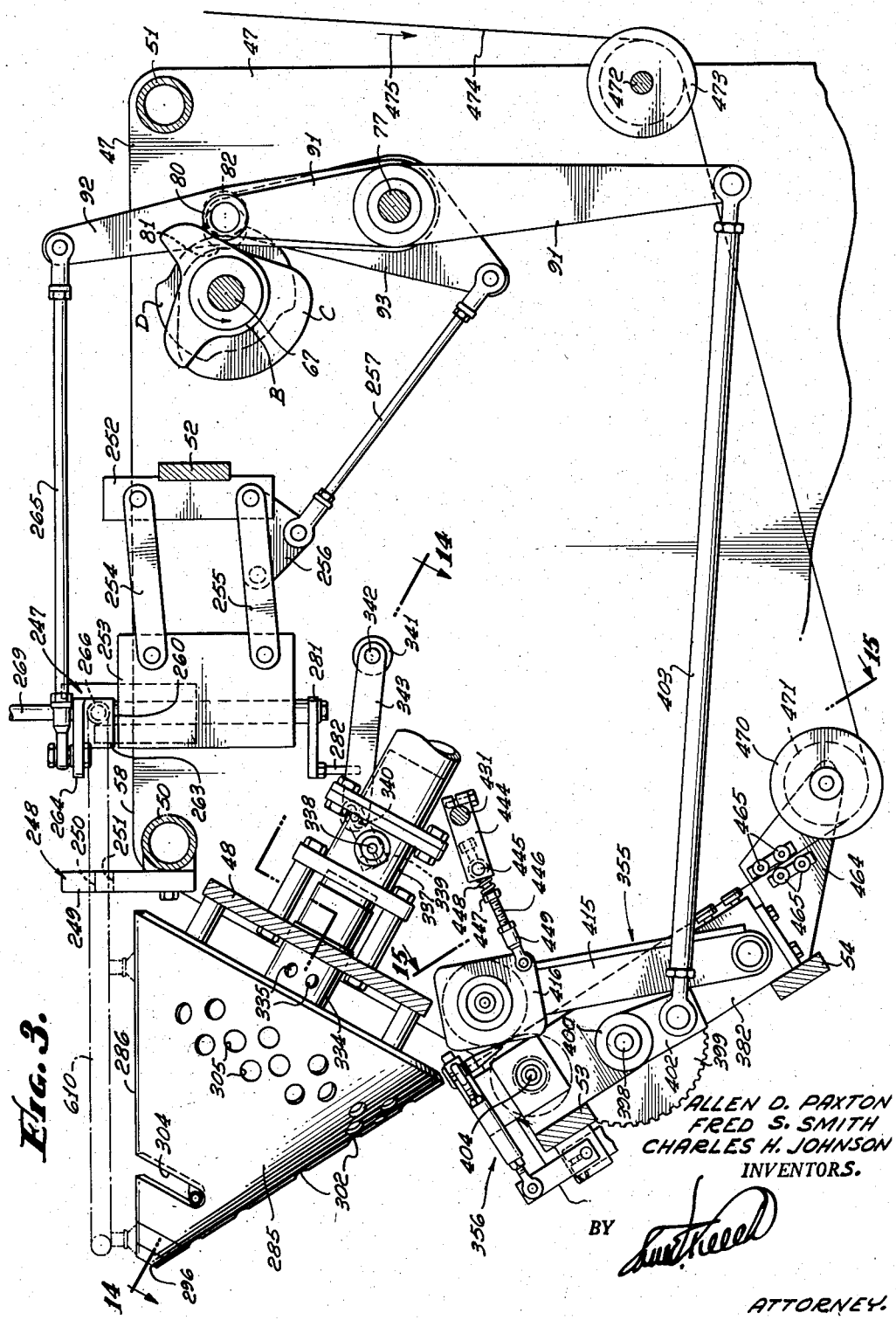

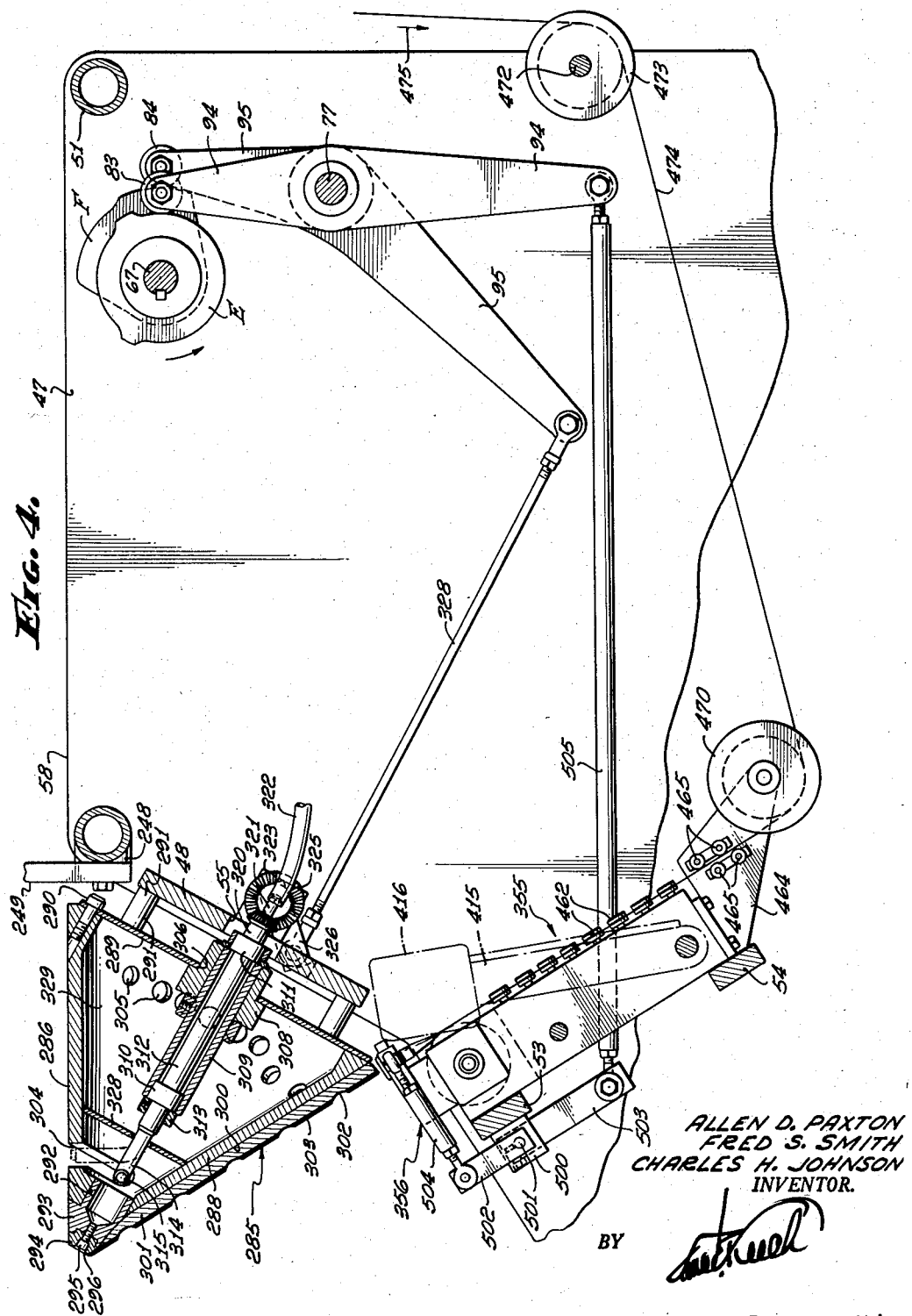

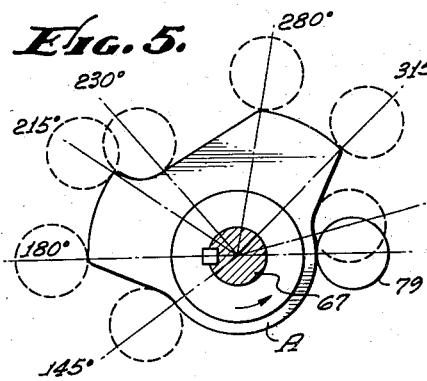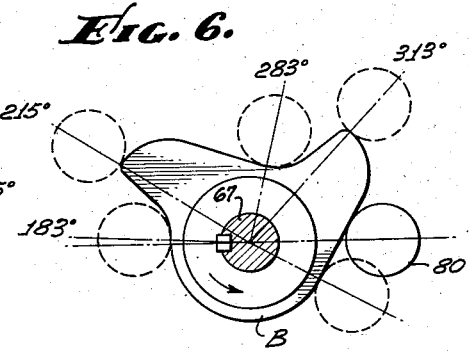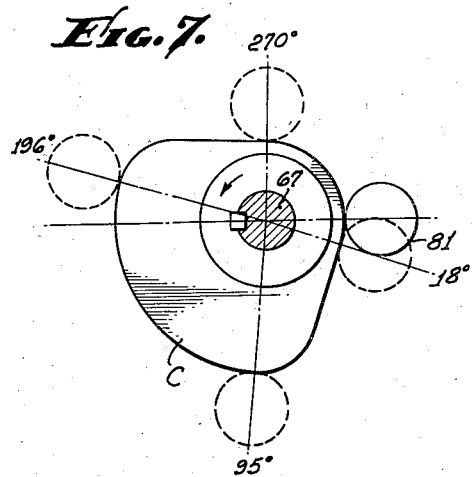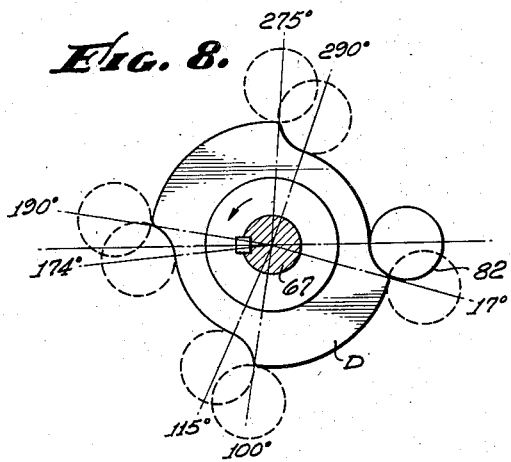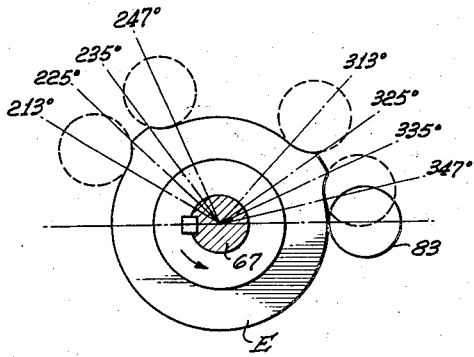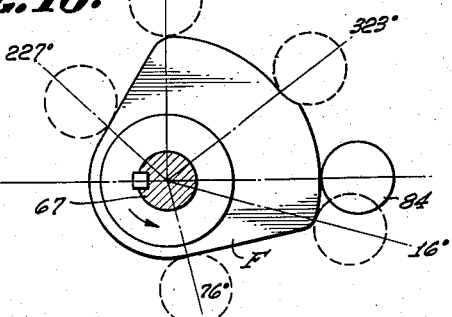
ALLEN D. PAXTON
FRED S. SMITH
CHARLES H. JOHNSON
INVENTORS.
BY
ATTORNEY.

April 28, 1959 A. D. PAXTON ET AL 2,883,914
METHOD AND APPARATUS FOR MAKING PAPER PLANT COVERS
Filed Aug. 1, 1956 11 Sheets-Sheet 6
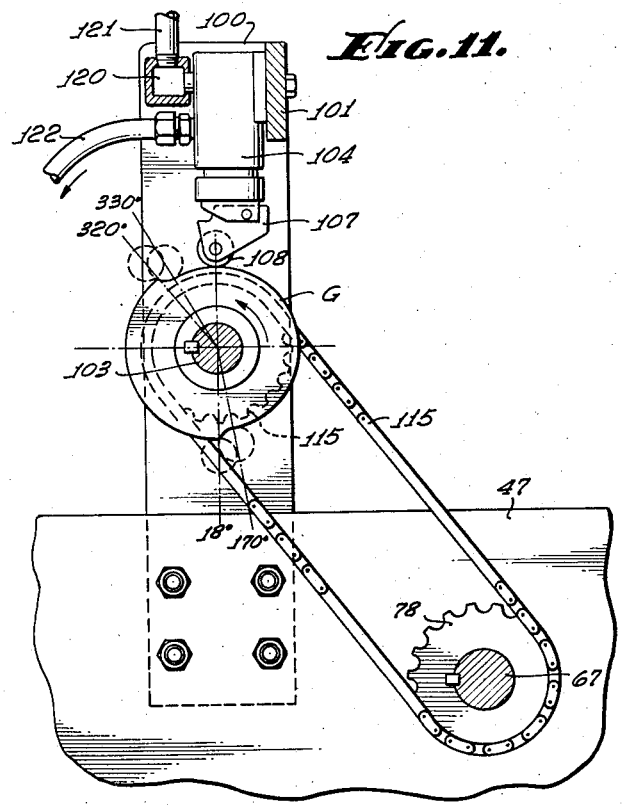
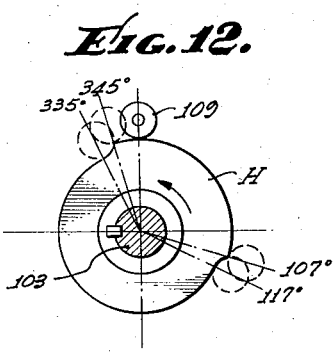
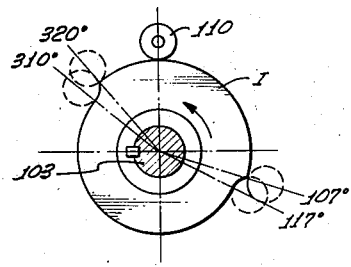
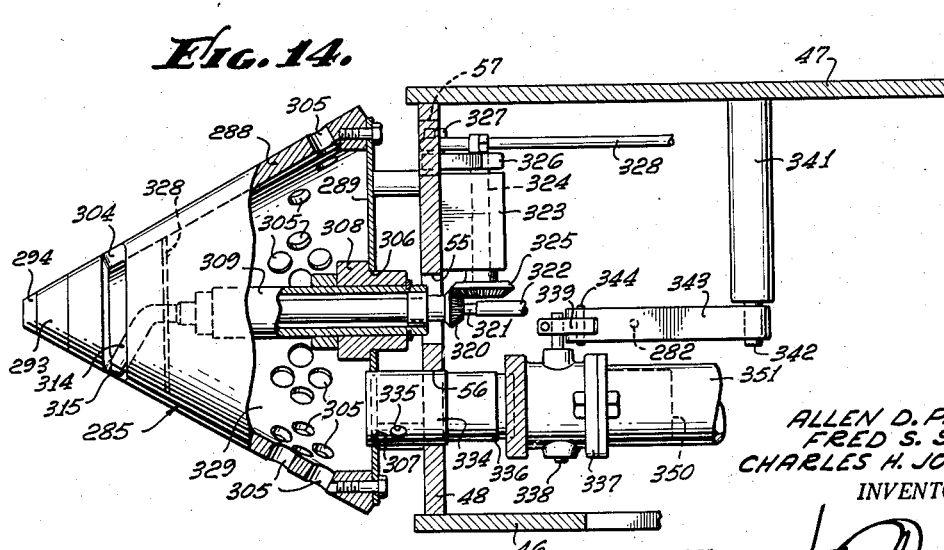
ALLEN D. PAXTON
FRED S. SMITH
CHARLES H. JOHNSON
INVENTORS.
BY
ATTORNEY.

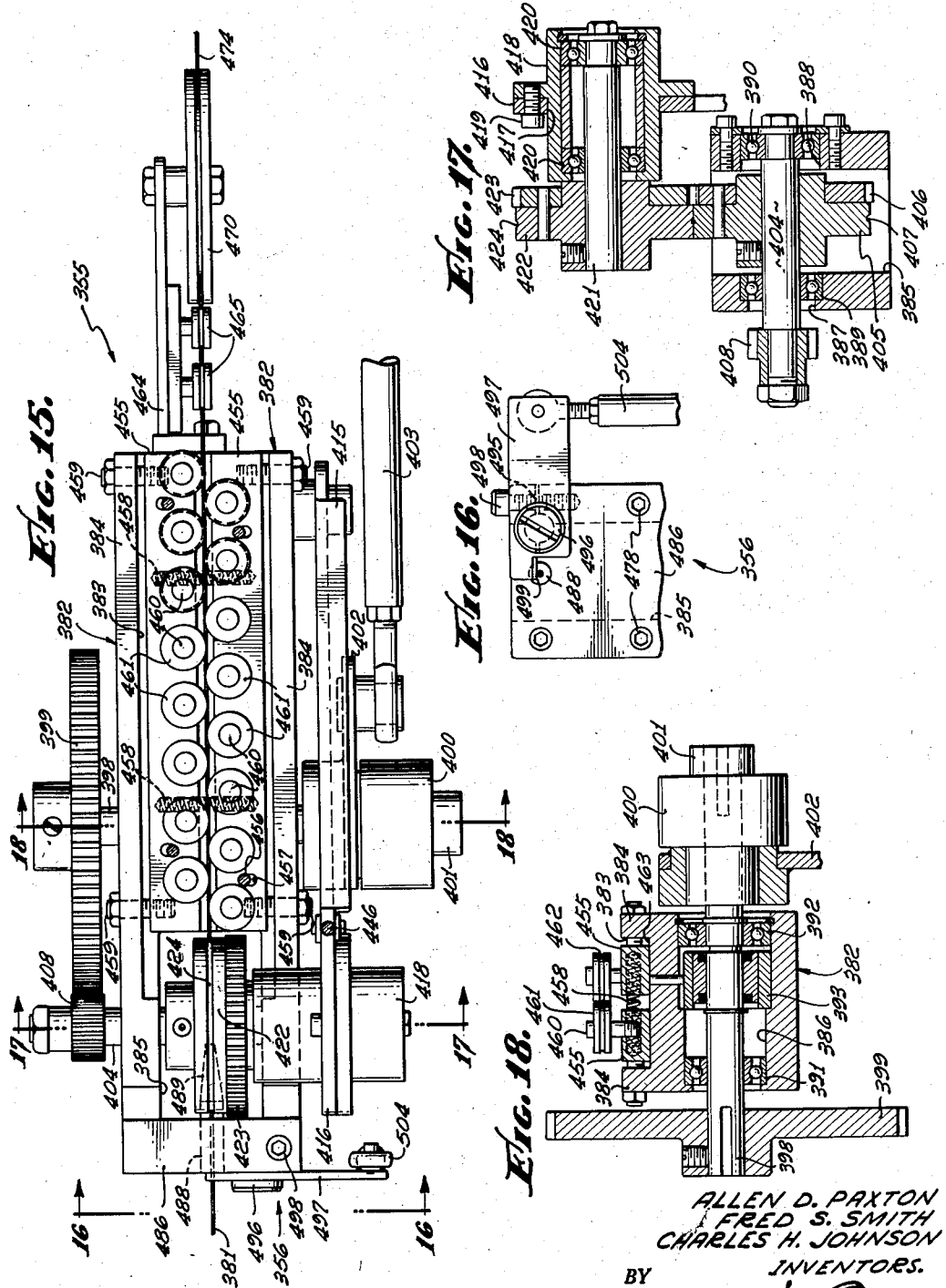

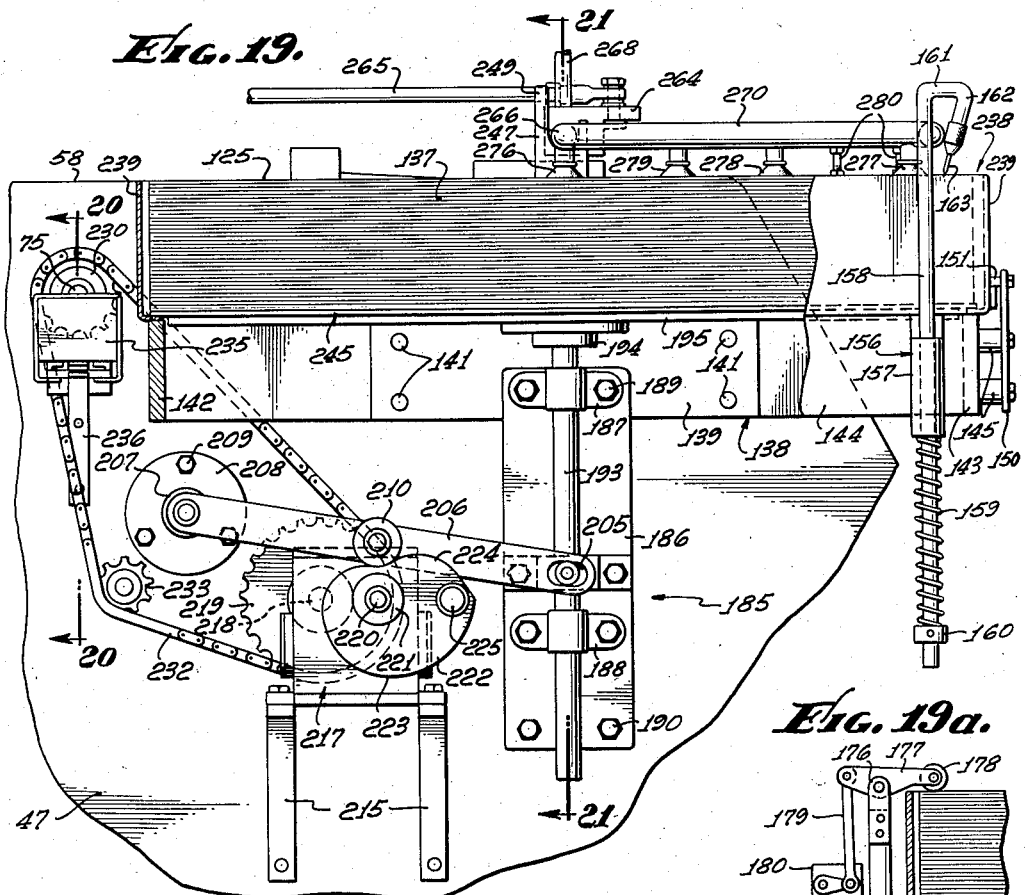
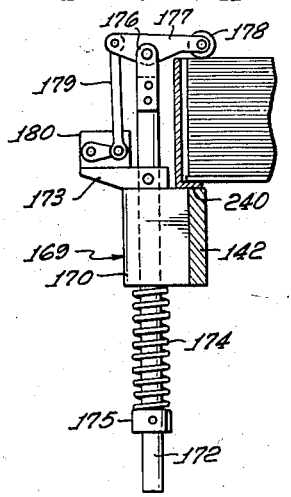
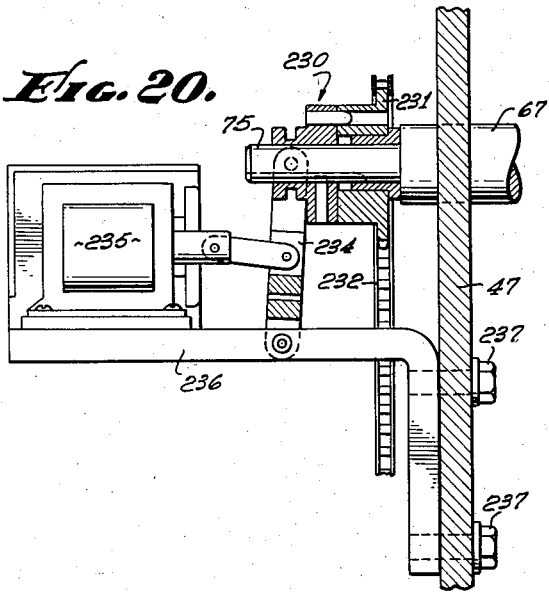

April 28, 1959 A. D. PAXTON ET AL 2,883,914
METHOD AND APPARATUS FOR MAKING PAPER PLANT COVERS
Filed Aug. 1, 1956 11 Sheets-Sheet 9
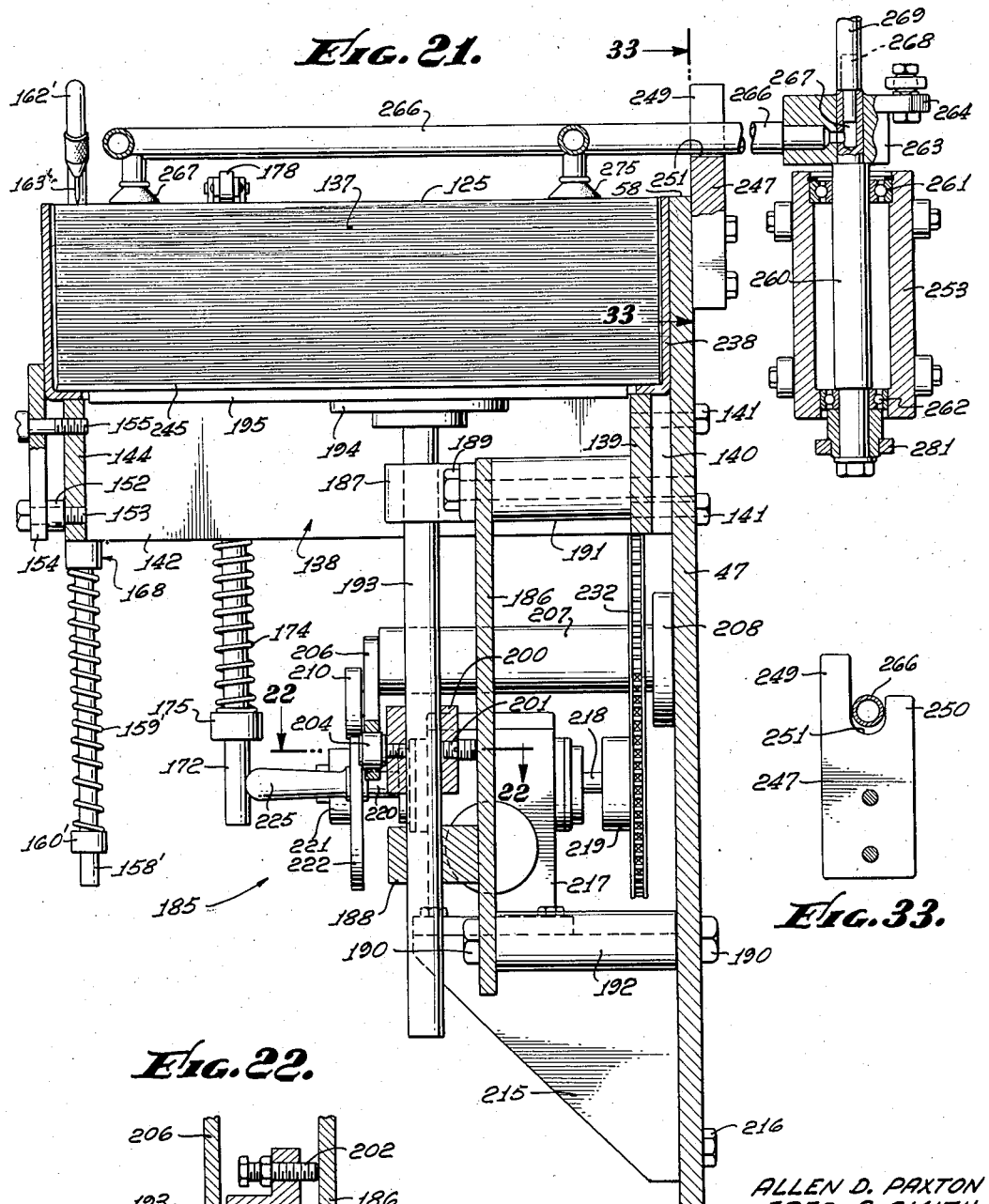
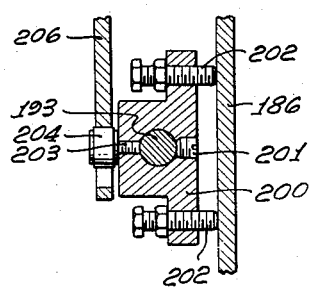
ALLEN D. PAXTON
FRED S. SMITH
CHARLES H. JOHNSON
INVENTORS.
BY
ATTORNEY.

April 28, 1959 A. D. PAXTON ET AL 2,883,914
METHOD AND APPARATUS FOR MAKING PAPER PLANT COVERS
Filed Aug. 1, 1956 11 Sheets-Sheet 10
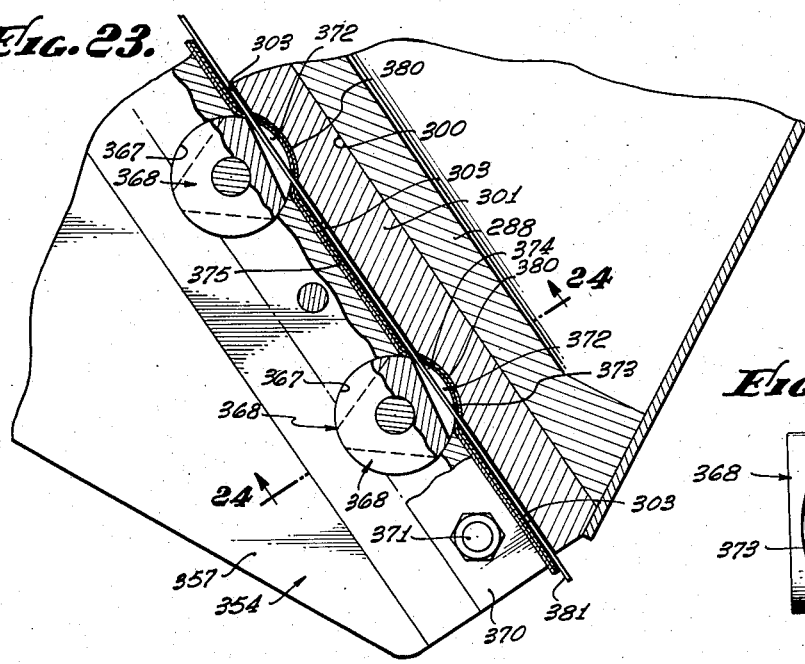
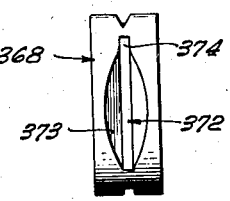
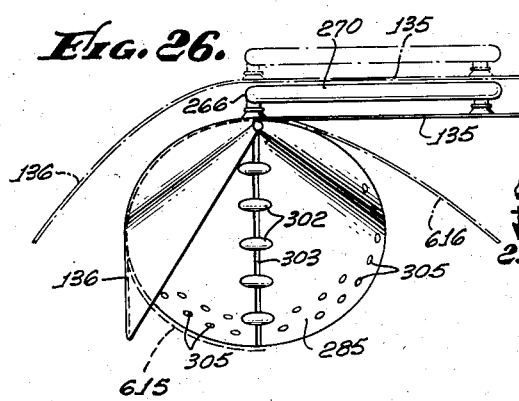
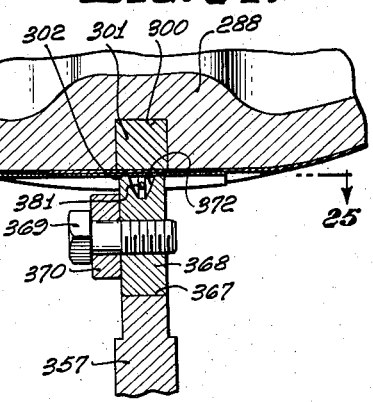
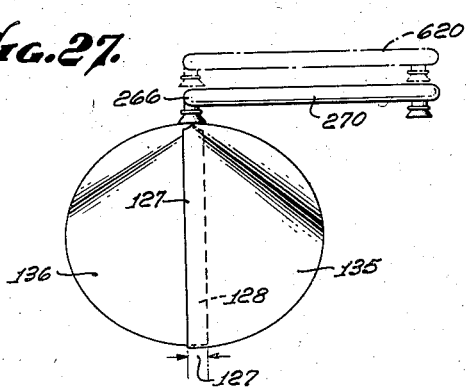
ALLEN D. PAXTON
FRED S. SMITH
CHARLES H. JOHNSON
INVENTORS.
BY
ATTORNEY.

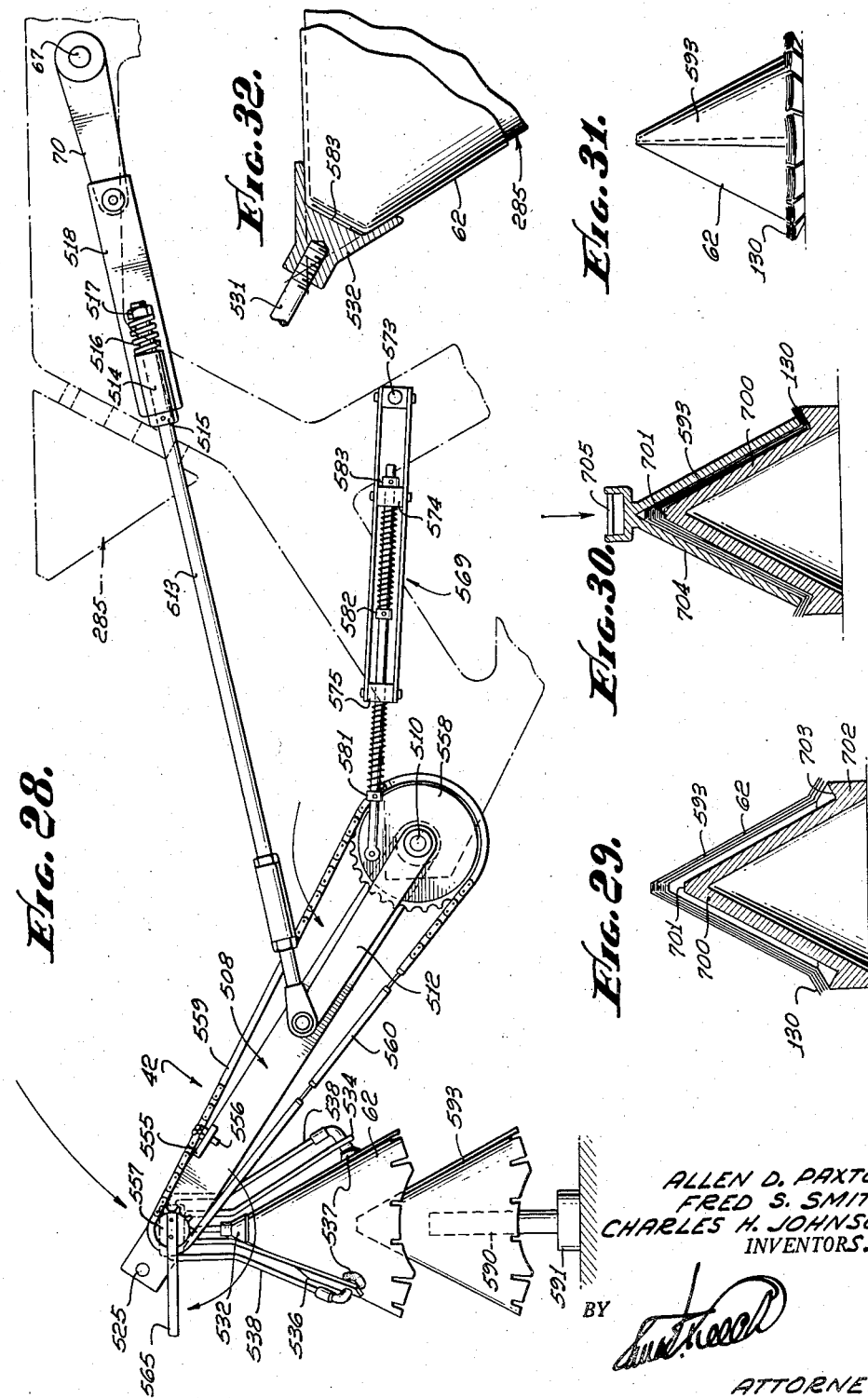

United States Patent Office 2,883,914
Patented Apr. 28, 1959

2,883,914

METHOD AND APPARATUS FOR MAKING PAPER PLANT COVERS

Allen D. Paxton, Fred S. Smith, and Charles H. Johnson, Riverside, Calif., assignors to Eleanor Paxton, Riverside, Calif.

Application August 1, 1956, Serial No. 601,473

14 Claims. (Cl. 93—36.2)

This invention relates to the art of manufacturing articles by forming these of relatively thin paper or the like and is particularly useful in the manufacture of substantially conical plant covers.

It is a primary object of the invention to provide a novel method of forming an article from a flat sheet of paper or the like by first causing said flat sheet to conform to the desired shape for the product so as to bring the free edges of the paper into juxtaposition and then securing said edges together to maintain said shape in said article.

It is another object to provide such a method and apparatus which is suitable for use in the manufacture of an article of substantially conical shape.

It is still another object of the invention to provide such a method and apparatus in which the means for securing together the meeting edges of the article constitutes a reinforcement for the same.

Still another object of the invention is to provide such a method and apparatus which facilitates the application of said securing means to said article not only for securing together meeting edges of the blank employed when making said article, but elsewhere on said article for providing additional reinforcement.

A still further object of the invention is to provide such a method and apparatus for the manufacture of a plant cover made of light paper or the like, and in substantially conical form, in which the meeting edges of the blank for forming the plant cover are stitched together by a straight length of wire which is forced lengthwise through a series of waves produced in said edges with the latter in overlapping relation and in which a piece of said wire is applied in a similar manner to a different portion of said plant cover for reinforcing the same.

It is still another object of the invention to provide such a method and apparatus in which the same wire stitching mechanism may be employed to accomplish both of the stitching operations in the formation of a conical plant cover.

It is another object of the invention to provide a novel wire straightening and propelling device for straightening and feeding the wire required in the manufacture of said plant cover and cutting off the same after it has been fed.

Yet another object of the invention is to provide a novel and efficient mechanism for supplying the blanks of paper or the like, employed in the operation of the invention for manufacturing conical plant covers, and in which stacks of blanks are contained in a cartridge type container which when it becomes emptied, may be readily replaced by a full container.

It is a still further object of the invention to provide a novel mechanism which cooperates with the shaping mandrel thereof in the formation of a conical plant cover to compact the apex portion of the formed cover to produce a radial wall closing the tip of the plant cover and immediately thereafter removing the finished cover from said mandrel and delivering said cover to a stack of the same.

The manner of accomplishing the foregoing objects as well as further objects of the invention will be made manifest in the following description taken in connection with the accompanying drawings in which:

Fig. 2 is a side elevation of Fig. 1. This view illustrates the linkage connecting main cam A with the elements actuated thereby.

Fig. 3 is a fragmentary sectional view taken on the line 3—3 of Fig. 1. This view selectively illustrates main cams B, C, D and the linkage connecting the same with the elements actuated thereby.

Fig. 4 is a view similar to Fig. 3 showing the conical cover-forming mandrel in section and illustrating main cams E and F and the linkage connecting these to the elements operated thereby.

Fig. 5 is a view taken on the line 3—3 of Fig. 1 and illustrates, at an enlarged scale and in zero position, main cam A and the various relationships therewith of its following roller at critical points in the functioning of said cam. Main cam A actuates the wave-forming clamp of the blank edge uniting means of the invention.

Fig. 6 is a view similar to Fig. 5 and illustrates main cam B and the various critical positions relative thereto of its follower roller. This cam actuates the wire feed device of the invention.

Fig. 7 is a view similar to Fig. 5 and illustrates main cam C and the various critical positions relative thereto of its cam follower roller. This cam swings the blank pickup arm horizontally between blank pickup position and blank delivering position.

Figure 1:
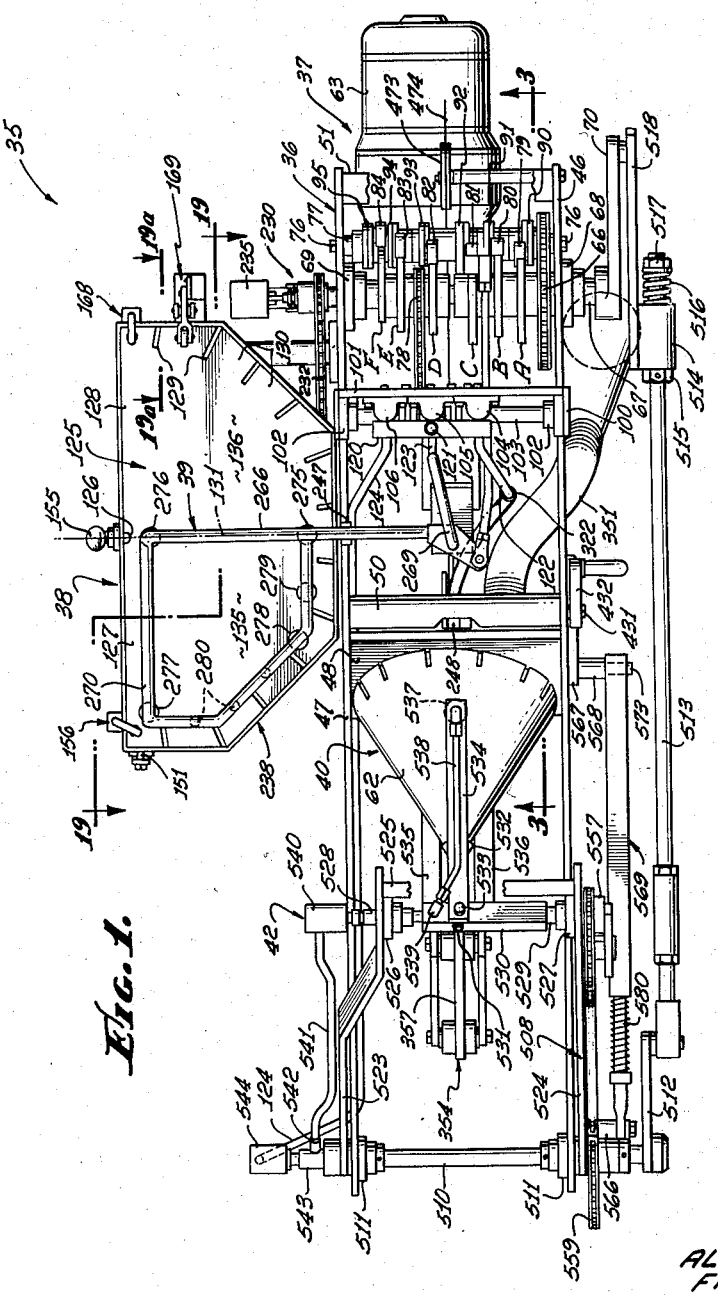
Fig. 1 is a plan view, at approximately ⅛-scale, of a preferred embodiment of the invention, with the parts thereof in zero position.

Fig. 8 is a view similar to Fig. 5 and illustrates main cam D with the various critical positions relative thereto of its cam follower roller. This cam operates the mechanism for lifting the blank pickup arm to lift the blank from the blank magazine, for lowering the pickup arm to deliver the blank into proper relation with the forming mandrel, for lifting the pickup arm out of contact with said blank and lowering said arm into contact with another blank in the blank magazine.

Fig. 9 is a view similar to Fig. 5 and illustrates main cam E and the various critical positions relative thereto of its cam following roller. This cam actuates the wire cutter of the invention.

Fig. 10 is a view similar to Fig. 5 and illustrates main cam F and critical positions relative thereto of its cam follower roller. This cam rotates the vacuum cup which partially rotates the plant cover on the conical coverforming mandrel of the invention.

Fig. 11 is an enlarged fragmentary vertical sectional view taken on the line 3—3 of Fig. 1 and illustrates the vacuum valve cam shaft and cam G thereof in zero position. This view also illustrates one of the vacuum controlled valves which responds to cam G, and through which a vacuum is generated in the vacuum cup for rotating the cover on the mandrel.

Fig. 12 is a fragmentary view similar to Fig. 11 but is confined to showing the vacuum cam H and the critical positions relative thereto of its cam follower roller. This cam controls the generation of a vacuum in the vacuum cups of the blank pickup arm.

Fig. 13 is a view similar to Fig. 12 and illustrates vacuum cam I and the various critical positions relative thereto of its cam follower roller. This cam controls the generation of a vacuum in the vacuum cups of the means for removing the finished plant cover from the conical mandrel of the invention.

Fig. 14 is a fragmentary sectional view taken on the line 14—14 of Fig. 3 and illustrates the mechanism for actuating the butterfly suction valve controlling the exhausting of air from the conical mandrel and the mechanism for controlling the rotation of the plant cover rotating vacuum cup mounted coaxially within the mandrel.

Fig. 15 is an enlarged fragmentary view taken on the line 15—15 of Fig. 3 and illustrates the wire straightening, feeding and cutting means of the invention.

Fig. 16 is a fragmentary detailed view taken on the line 16—16 of Fig. 15 and illustrates the wire cutter.

Fig. 17 is a transverse sectional view through the wire clamping and feed rollers of the invention and is taken on the line 17—17 of Fig. 15.

Fig. 18 is a transverse sectional view taken on the line 18—18 of Fig. 15 and illustrates the main gear drive shaft and the two uni-directional clutches employed on said shaft in the intermittent driving thereof.

Fig. 19 is an enlarged sectional view taken on the line 19—19 of Fig. 1 and illustrates the blank magazine actuating mechanism of the invention.

Fig. 19A is an enlarged sectional detail view taken on the line 19A—19A of Fig. 1.

Fig. 20 is an enlarged detailed sectional view taken on the line 20—20 of Fig. 19 and illustrates the magnetic clutch through which said magazine mechanism is driven.

Fig. 21 is a vertical transverse sectional view taken on the line 21—21 of Fig. 19 and illustrates the blank stack elevator and the vertical pivotal mounting of the blank pickup arm.

Fig. 22 is a detailed sectional view taken on the line 22—22 of Fig. 21 showing the guide clamp of the platform lift of the blank magazine.

Fig. 23 is an enlarged fragmentary view illustrating the mode of operation of the wave-forming clamp of the inventon which is a part of the wire stitching mechanism thereof.

Fig. 24 is a detailed cross-sectional view taken on the line 24—24 of Fig. 23 and illustrates the manner in which the wire employed in stitching together opposite edges of the paper blank is guided while being driven through waves formed in said edges.

Fig. 25 is a detailed sectional view taken on the line 25—25 of Fig. 24 and shows the shape of the guide slot in one of the guide cylinders of the wave-forming clamp by which the wire is properly guided in the stitching operation.

Fig. 26 is a diagrammatic view illustrating the manner in which a blank is delivered by the blank pickup arm into proper relation with the conical mandrel of the invention with one-half of the blank trailing in the air and then dropping by gravity into partial conformation with the mandrel while the leading half of said blank remains supported by the pickup arm.

Fig. 27 is a view similar to Fig. 26 and illustrates the manner in which the blank delivered, as shown in Fig. 26, is wrapped into conformation with the mandrel by suction of air inwardly through the foraminous wall of the mandrel and also shows the lifting of the blank pickup arm from contact with the blank following the wrapping of the blank about the mandrel.

Fig. 28 is a diagrammatic fragmentary operational view of the mechanism for removing a finished cover from the conical forming mandrel and the dropping of this cover on a post so that it will gravitate into nested relation with a stack of covers previously thus delivered.

Fig. 29 is a diagrammatic transverse sectional view of a conical form with a stack of finished plant covers placed thereon preparatory to shaping the lower marginal portions of said covers to form anchoring flanges thereon.

Fig. 30 is a view similar to Fig. 29 and illustrates the pressing of a conical bell downwardly on said stack of plant covers to press the latter into conformation with said form to produce said anchoring flanges on said covers.

Fig. 31 is a side-elevational view of said stack of plant covers after the same have been compressed as shown in Fig. 30.

Fig. 32 is a fragmentary sectional view illustrating the manner in which the tip portion of a plant cover is compacted to form a radial wall closing the tip of said cover just as the finished cover removing means suctionally engages the cap externally to lift the same from the conical forming mandrel.

Fig. 33 is a detail sectional view taken on the line 33—33 of Fig. 21 and illustrates the structure of one of the two rests provided for the cover blank pickup and delivery arm of the invention.

Referring specifically to the drawings, a preferred embodiment of the apparatus of the invention is there illustrated as a plant cover making machine 35.

This includes a main frame 36, on which are mounted a power mechanism 37, a cover blank magazine 38, an individual blank delivery mechanism 39, a cover shaping and rotating mechanism 40, a blank edge uniting and cover reinforcing mechanism 41, and a cover tip compacting and finished cover removing mechanism 42.

MAIN FRAME 36

The main frame includes a base 45 which rigidly unites front and rear frame plates 46 and 47 which are also held vertically in rigid spaced relation by connecting plates 48 and 49, by connecting tubes 50 and 51 and by connecting bars 52, 53 and 54. The plate 48 has holes 55 and 56 (Fig. 14) and a notch 57, the purposes of which will be made clear hereinafter.

The main frame plates 46 and 47 are identical in outline and have a common upper horizontal plane 58, the plate 46 being distinguished from the plate 47 by having openings 60 and 61.

POWER MECHANISM 37

This mechanism coordinately drives all of the other aforesaid mechanisms so as to cause them to function in the proper order through an indefinite series of cycles of operation in each of which the machine 35 produces and delivers therefrom a completed plant cover 62.

To simplify the illustration of the invention in which all of the parts pass through a number of different positions during each cycle of operation the principal illustrations depict the parts illustrated in what is referred to as "zero position." The parts of machine 35 are shown in full lines in zero position in Figs. 1 to 21 inclusive, in which it is seen that a plant cover 62 has just been completely formed in the machine and the tip compacting and removal mechanism 42 has just externally engaged this plant cover suctionally and is about to remove said cover from the cover shaping and rotating mechanism 40. The cover blank delivery mechanism 39 is positioned in readiness to pick up a single blank from the blank magazine 38 and deliver this blank to the shaping mechanism 40 in the performance of its function in the next following cycle of operation.

This is only to give a general idea of the situation existing at the zero position adopted in the following description as the beginning and ending of successive cycles of operation in the machine 35. A detailed description of such an operational cycle follows this description of the structure of the machine.

The power mechanism 37 includes a geared electrical motor 63 which is mounted on cross-plate 49 and has a drive pinion 64 which is connected by a chain 65 to a driven sprocket 66 which is mounted on a main cam shaft 67 which journals in bearings 68 and 69 which are mounted respectively on the main frame plates 46 and 47. Shaft 67 extends outwardly from bearing 68 to receive an arm 70 which is keyed to said shaft. Shaft 67 also has at its other end an extension 75 of reduced diameter. Mounted at its opposite ends on the frame plates 46 and 47 secured thereto by cap screws 76 is a rocker mounting shaft 77.

Fixed on main cam shaft 67 (Fig. 1) between sprocket 66 and bearing 69 are the following elements: main cam A, main cam B, main cam C, main cam D, vacuum control drive sprocket 78, main cam E and main cam F. Main cams A–F are provided respectively with cam follower rollers 79, 80, 81, 82, 83 and 84. These rollers are mounted respectively on rockers which are freely rotatable on rocker shaft 77 and are identified respectively by numerals 90, 91, 92, 93, 94 and 95.

Secured to outer faces of frame plates 46 and 47 and extending upwardly therefrom are plates 100, these being united by a cross-plate 101 and having two bearings 102 in which a vacuum-control cam shaft 103 journals.

Plate 101 has fixed thereon three vacuum valves 104, 105 and 106. These valves are of the normally closed type and have built-in rockers 107 and cam follower rollers 108, 109 and 110 respectively, which are in radial alignment with and actuated by cams G, H and I which are fixed on shaft 103. The shaft 103 also has a driven sprocket 114 which is connected by an endless chain 115 with drive sprockets 78 on main cam shaft 67 (Figs. 1, 11, 12 and 13). The valves 104, 105 and 106 connect with a vacuum manifold 120 from which air is extracted by a vacuum pump (not shown) to which the manifold 120 is connected by a pipe 121. The valves 104, 105 and 106 when opened individually connect said manifold respectively with vacuum pipes 122, 123 and 124. When closed individually, said valves open said pipes respectively to the atmosphere.

COVER BLANK MAGAZINE 38

The blanks 125 which this magazine supplies for use in the machine 35 are die-formed of light waxed paper stock, or of glassine, or of other suitable light-weight flexible sheet material. Each of these blanks is approximately semi-circular in shape and is shown in the drawings as preferably semi-octagonal. Formed concentrically with the octagon of which this blank is a part is a semi-circular notch 126 which is at the center of an otherwise continuous diametral edge of the blank and divides said edge into edge portions 127 and 128. Formed in the blank 125 along lines radiating from the center of notch 126 are narrow peripheral notches 129, the inner ends of which terminate on a common radius from said center. Flange tabs 130 are thus formed throughout the semi-octagonal periphery of the blank 125.

The blank 125 is thus seen to be formed symmetrically with reference to an axis of symmetry 131 passing through the center of notch 126 and lying at right angles with the edge portions 127 and 128 of the blank. The axis 131 thus divides the blank 125 into halves 135 and 136.

The blank magazine 38 operates to store a stack 137 of blanks 125 and maintain these in readiness for delivery for use in the machine 35 from approximately the level of the upper horizontal plane 58 of the frame 36, and furthermore provides a means for readily introducing another stack of blanks into said magazine when the first stack has become exhausted. To accomplish these ends, magazine 38 has a perimetral tray supporting frame 138 including a backbar 139 which is spaced from the frame plate 47 by a spacer plate 140 and secured to said frame plate by cap screws 141. The frame 138 has approximately the same outline as a blank 125 and is disposed directly beneath and in symmetrical alignment with the stack 137 of such blanks in magazine 38.

Frame 138 also includes end bars 142 and 143 and a front bar 144. Fixed on end bar 143 by spacers 145 is a bar 150 which extends above the upper edge of frame 138 and has an internal dog 151 near its upper end.

Spaced from the front frame bar 144 by a spacer 152 (Fig. 21) and secured thereto by a bolt 153 is a clamp bar 154. The clamp bar is thus mounted at its lower end and has a thumb screw 155 extending loosely through a hole therein and screwing into a threaded hole in the front magazine frame bar 144. The clamp bar 154 is located near the center of the magazine 38.

Also mounted on the front frame bar 144 adjacent to the end bar 143 is a needle device 156 which includes a mounting block 157 which is welded on the frame bar 144 and has a central aperture in which a rod 158 is vertically slidable. The lower end of the rod extends downwardly below the block 157 and carries a relatively long expansion spring 159 which is held on the rod by a collar 160. The upper end portion 161 of the rod is bent laterally and downwardly where it supports a needle chuck 162 in which a needle 163 is removably mounted.

Another needle device 168 which is like the needle device 156 is mounted on the magazine frame bar 142 near its juncture with the front bar 144. Any reference to parts of the needle device 168 will make use of the same reference numerals used to identify corresponding parts of needle device 156, with prime attached.

Mounted on magazine frame end bar 142 (Figs. 19A and 21) is a stack elevating control device 169. This includes a mounting block 170 which is welded to bar 142 and has a vertical hole therein for slidably receiving a shaft 172. A vertically apertured switch base 173 is fixed on the shaft 172 so as to normally rest on the upper end of block 170. A coiled expansion spring 174 surrounds the downwardly extended portion of shaft 172 and is held thereon by a set collar 175. The shaft 172 extends upwardly above the switch base 173 and has mounted thereon a pivot fork 176 on which is pivoted a rocker 177 carrying a roller 178 on its inner end and pivotally connected at its outer end to a rod 179 which connects to an operating lever of a switch 180 mounted on switch base 173. This switch is provided internally with a spring which normally holds said switch in open position. Upward movement of the roller 178 overcomes this spring so as to close switch 180.

The magazine 38 also includes an elevator mechanism 185 which is driven by the extension 75 of the main cam shaft 67 (Figs. 1 and 19). The mechanism 185 includes an elevator shaft mounting plate 186 on which bearings 187 and 188 are mounted in vertical alignment and which is secured by bolts 189 and 190 and spacers 191, and 192 to the blank magazine frame backbar 139 and to the main frame back plate 47 respectively. Slidable vertically in the bearings 187 and 188 is a stack elevator shaft 193, carrying a flanged head 194 on its upper end, to which is secured an elevator platform 195, the latter loosely fitting within the vertical opening provided by the walls of the magazine frame 138. To prevent rotation of the shaft 193 while it slides vertically in the bearings 187 and 188, a guide block 200 is secured on said shaft by a set screw 201, which block has guide screws 202 which are adjustably set to slidably bear against plate 186. A threaded roller mounting pin 203 is screwed into a threaded hole provided in the block 200 which is in alignment with the set screw 201 and on the opposite side of the shaft 193 therefrom, to provide a mounting for an elevating roller 204. This roller is received in a slot 205 of a lifting lever 206 which fulcrums at its opposite end on a horizontal stud 207 having a flange 208 which is secured to the main frame plate 47 by cap screws 209. Approximately at its middle, lever 206 pivotally mounts a cam follower roller 210.

Supported on brackets 215 which are secured by cap screws 216 to the main frame plate 47 is a reduction gear box 217 having an "input" shaft 218 which carries a driven sprocket 219 and an "output" shaft 220 carrying a uni-directional clutch 221 on which is mounted a cam 222 which is disposed below, in vertical alignment with, and in supporting relation with the cam follower roller 210.

The shaft 220 of the gear box 217 is rotated in a clockwise direction (viewed as seen in Fig. 19), when the input shaft 218 is so rotated, and the clutch 221 is designed to transmit this rotation to the cam 222 while allowing free rotation of said cam relative to said shaft when force is applied to said cam to rotate the same in a clockwise direction at a faster rate of speed than shaft 220 is rotating.

The cam 222 has a long spiral working cam face 223 and a relatively short idling cam face 224. Fixed on the cam 222 is a handle 225 the purpose of which will be made clear hereinafter.

The mechanism 185 also includes a magnetic clutch 230 (Figs. 19 and 20) which is mounted on the shaft extension 75 and carries a sprocket 231 this being connected by an endless chain 232, tightened by an idler 233, with sprocket 219 so that the latter is rotated through said chain whenever the shaft 67 is rotating and clutch 230 is engaged. The clutch 230 is actuated through a pivoted yoke 234 by a solenoid 235 mounted on a bracket 236 which is secured by bolts 237 to the main frame plate 47 (Fig. 20). The solenoid 235 includes an expansion spring (not shown) which closes clutch 230 whenever said solenoid is de-energized. The switch 180 is included in the circuit of the solenoid 235 so that in the absence of upward pressure against roller 178 (Fig. 19) (which pressure would close switch 180) said switch is open and the spring in solenoid 235 is free to close clutch 230 and cause the rotation of sprocket 219 of the reduction gear 217.

The magazine 38 also includes a plurality of stack trays 238, only one of which is used at a time in the magazine 38, but which are used as stack cartridges for consecutive insertion into the magazine mechanism to keep the latter supplied with a stack 137 of blanks.

Each tray 238 includes a perimetric shell 239 formed of light sheet-metal, this shell being shaped to neatly receive a stack 137 of blanks 125, and has a flange 240 extending inwardly from the lower edge thereof for supporting a tray-bottom plate 245 which is made of light sheet-metal and supports the stack of blanks placed in the tray. Each tray 238 is provided with a lug 246 which fits under the lug 151 formed on the upper end of the bar 150 (Fig. 19) so as to hold the tray 238 resting firmly on the magazine base frame 138. When inserting a tray 238 into or removing it from magazine 38, the upper portions 161 and 161' of the needle devices 156 and 168 are rotated to allow said upper ends to be drawn downward by the springs 159 and 159' below the upper edge of the base frame 138 so that these devices will not interfere with the horizontal movement of the tray 238 across the upper edge of said frame. Before insertion or removal of a tray 238, the shaft 172 is also rotated a quarter-turn from the position this is shown in, in Fig. 19, to remove the roller 178 from the path of the tray.

The tray 238 is of course slid into place in a direction at right angles to the front base frame bar 144 and, when this movement is completed, the clamping bar 154 is rotated into vertical position and the thumb screw 155 screwed into place as shown in Fig. 21 so as to clamp the stack tray 238 firmly against the main frame plate 47.

After a loaded tray has been thus inserted in the magazine, the needle carrying upper portions of the needle devices 156 and 168 are lifted above the upper level of the trays and rotated so as to permit the needles 163 and 163' to be yieldably urged downwardly against the upper surface of the blank stack 137 by the action of the springs 159 and 159'. The shaft 172 of the control device 169 is now lifted, rotated to bring roller 178 over the stack 137 and lowered to rest roller 178 on said stack as shown in Fig. 19A.

INDIVIDUAL BLANK DELIVERY MECHANISM 39

This mechanism includes a pair of blank pickup arm rests 247 and 248 the first of which is mounted on the main frame plate 47 (Figs. 1, 2, 19 and 21) and the second of which is mounted on the main frame cross tube 50. Each of these arm rests is formed of a piece of heavy plate metal, the upper portion of each of which, disposed toward the other, is cut away to provide a back-stop 249 and a lower front-stop 250 with a recess 251 formed downwardly between said stops for a purpose to be made clear hereinafter. Mechanism 39 also includes a block 252 which is rigidly fixed to the frame crossbar 52 (Fig. 3), and a vertically shiftable bearing block 253 which has a parallelogram mounting on block 252 through parallel pairs of links 254 and 255, one of the latter having a downward extension 256 which pivotally connects to one end of a connecting rod 257, the other end of which pivotally connects to the lower extremity of rocker 93.

Vertically shiftable bearing block 253 is vertically bored to provide for the reception of a shaft 260, and for mounting bearings 261 and 262 in which said shaft journals and by which it is supported. Welded on the upper end of shaft 260 is a hub member 263 having an arm 264 which is pivotally connected with one end of an adjustable link 265, the other end of which is pivotally connected to the upper end of rocker 92. The hub member 263 has a tubular pickup arm 266 which connects through a hole 267 bored in the upper end of shaft 260 with a hose nipple 268 extending axially upward from said shaft and which is united by a hose 269 to vacuum tube 123 of vacuum valve 105 (Figs. 1 and 2). When in zero position, the blank pickup arm 266 extends from the hub member 263 in the vertical plane of the line of symmetry 131 of the blanks 125 in the magazine 38 (Fig. 1) and occupies the recess 251 of the arm rest 247 (Fig. 21). The arm 266 is made of thin-walled tubing and has a lateral loop 270 which provides a mounting for vacuum cups 275, 276, 277, 278, and 279, and through which air may be extracted from said cups causing them to suctionally engage and lift the uppermost blank 125 from a stack 137 of the same in the magazine 38. The loop 270 of arm 266 is also provided with arm supporting fingers 280 which are located between the cups 277 and 278 and are vertically adjusted to bear against the stack 137 and thus relieve the vacuum cups 275–279 of having to support the arm loop 270.

Fixed on the lower end of the shaft 260 (Figs. 3, 14 and 21) is a horizontal arm 281 having a finger 282 extending downwardly from its outer end. This finger controls part of the operation of the cover-shaping and rotating mechanism 40 in a manner which will be made clear hereinafter.

COVER-SHAPING AND ROTATING MECHANISM 40

This mechanism includes a substantially conical mandrel 285 (Figs. 3, 4, and 14) which is mounted on the main frame cross-plate 48 so that a rectilinear surface element 286 thereof is disposed in the horizontal plane 58 of the upper edge of the main frame 36 of the machine 35. The mandrel 285 comprises a cast shell 288 the base end of which is covered by a base plate 289 which is secured to shell 288 by cap screws 290 and is itself secured to the frame plate 48 by spacers 291. The shell 288 has a nose bore 292 into which a nose piece 293 fits, the latter having a wear tip 294 which is held in place by a screw 295 and provides a flat-surfaced nose 296 on the mandrel 285.

Formed in the mandrel 285 to lie directly opposite the rectilinear element 286 thereof is a seat 300 in which is mounted a fixed wire guide 301, this guide being provided with a series of transverse wave-forming notches 302 and a rectilinear wire-guiding groove 303 which lies substantially in the same vertical plane with the rectilinear element 286 and the axis of the mandrel 285. The groove 303 is not only formed in the wire guide 301 but is extended upwardly through the mandrel wear tip 294 (Fig. 4).

The conical shell 288 has a slot 304 formed therein near the tip of the shell, said slot lying in a radial plane relative to the axis of the shell and extending sightly over 180° about said axis. The walls of said slot are disposed at right angles with the intersected rectilinear surface elements of the outer conical surface of the shell 288. The purpose of slot 304 will be made clear hereinafter.

The shell 288 has a series of air-passage holes 305 formed therein, preferably in accordance with the pattern shown in Figs. 3, 4 and 14 of the drawings.

The base plate 289 has a central hole 306 and an eccentric hole 307 (Figs. 4 and 14). Mounted in the hole 306 is a heavy collar 308 in which is mounted a ball bearing mounting sleeve 309 carrying ball bearings 310 and 311 adjacent its opposite ends in which bearings a hollow shaft 312 journals. The upper end of shaft 312 carries a set collar 313 and terminates in a vacuum nozzle 314 which is bent to extend into the slot 304 and carries at its tip a cover-rotating vacuum cup 315. Fixed on the downward extending end of the shaft 312 is a bevelled pinion gear 320, the lower end of the shaft 312 having a nipple 321 which extends downwardly beyond said pinion gear and has applied thereto a vacuum hose 322 the other end of which connects with the vacuum pipe 122 of the vacuum valve 104 (Fig. 1). The sleeve 309 and pinion sprocket 320 are concentric with and extend through the hole 55 in the main frame plate 48.

Fixed on the lower face of said plate is a bearing block 323 having a horizontal hole in which is journalled a short shaft 324 on one end of which is fixed a bevelled gear 325 which meshes with pinion gear 320. Fixed on the opposite end of shaft 324 is an arm 326 which is pivotally connected by a bolt 327 to one end of an adjustable link 328, the opposite end of which is pivotally connected to the lower end of main power rocker 95 (Figs. 4 and 14).

It is thus clear that rotation of rocker 95 on rocker shaft 77 by the roller 84 following main cam F causes a rotation of hollow shaft 312, and the nozzle 314 mounted thereon, so as to swing the vacuum cup 315 approximately from one end to the other of the slot 304 in the mandrel shell 288. The recess 57 in cross-plate 48 accommodates arm 326 and the front end of rod 328 when these are swung forwardly (Fig. 14).

Mounted within the shell 288 and apertured centrally to permit the nozzle 314 to extend freely therethrough is a thin wall 328 which cooperates with the wall 289 to form a suction chamber 329 in the shell 288. Means for producing a suction in this chamber include a short pipe 334 of large diameter which extends into hole 307 in base plate 289 and is welded thereto. Pipe 334 also extends through hole 56 of main frame plate 48 which is in alignment with hole 307 of plate 289. This pipe has formed therein between said plates a pair of small holes 335 the purpose of which will be made clear hereinafter. Secured in the lower end of pipe 334 is a connection nipple 336 which connects pipe 334 with and provides support for a butterfly valve 337. This valve has an actuating shaft 338, the inner end of which carries an arm 339 having a radial slot 340 formed therein (Fig. 3).

Fixed on the rear main frame plate 47 (Figs. 3 and 14) is a stud 341 carrying a pin 342 on its extremity on which one end of a lever 343 is pivoted. The other end of said lever is bifurcated to slidably receive the butterfly valve arm 339 and has a pin 344 which extends through the slot 340 in said arm whereby downward rotation of the lever 343 rotates shaft 338 so as to open the butterfly valve 337. Suitable spring means (not shown) provides a constant torque bias which rotates the shaft 338 into valve closing position, as shown in the drawings, and maintains valve 337 closed, excepting when lever 343 is depressed by engagement of the finger 282 therewith.

The finger 282 depresses the lever 343 when said finger is disposed over said lever as shown by broken lines in Fig. 14 and then lowered. This occurs when the individual blank delivery mechanism 39 is actuated to deliver a cover-forming blank 125 over the mandrel 285.

Valve 337 has a large diameter nipple 350 which is connected by a flexible tube 351 (Figs. 1, 2 and 14) and a conical sheet-metal adapter 352 with the intake end of a motor-driven suction fan 353 mounted on the frame base 45.

BLANK EDGE UNITING AND COVER REINFORCING MECHANISM 41

This mechanism includes the fixed wire guide 301, above described as rigidly mounted on the shaping mandrel 285 (Fig. 4); a shiftable wire guide and wave-forming device 354 (Figs. 1, 2, 23, 24 and 25); a wire straightening and feeding device 355 (Figs. 3, 15, 17 and 18); and a wire cut-off device 356 (Figs. 3, 4, 15 and 16).

The device 354 includes a shiftable member 357 which has a pivotal parallelogram mounting on parallel arms 358 of equal length which are fixed on shafts 359 and 360 which journal in suitable bearings provided on main frame plates 46 and 47 (Fig. 2). The shaft 360 has an arm 365 the lower end of which is pivotally connected to one end of an adjustable link 366 the other end of which pivotally connects to the lower end of main rocker 90 (Figs. 1 and 2).

The member 357 is thus adapted to be cam-reciprocated towards and away from the fixed wire guide 301 on the mandrel 285 so as to be alternately brought into very close face-to-face relation with said wire guide 301 (as shown in Fig. 23) and then subsequently shifted into widely spaced relation with this as shown in Fig. 2. The member 357 has a series of laterally open bores 367 into which centrally apertured guide cylinders 368 snugly fit. These guide cylinders are held rigidly in their respective bores 367 by cap screws 369 which secure these to a bar 370 which in turn is secured by bolts 371 to member 357. The bores 367 are formed on the member 354 directly opposite the wave-forming notches 302 provided on the wire guide 301 so that the cylinders 368, which extend from open sides of the bores 367, will fit into said notches when the member 357 moves into face-to-face relation with wire guide 301 (as shown in Figs. 23 and 24). Each of the cylinders 368 (Fig. 25) is provided with three equally spaced peripheral guide grooves 372 each of which has a widely flared initial end portion 373 and a relatively narrow parallel-wall final-end portion 374. Each of the cylinders 368 is so rotationally positioned on the bar 370 that one of the grooves 372 will be exposed beyond the edge 375 of the member 357 and inclined as shown in Fig. 23. The groove 303 on the fixed wire guide 301 and the grooves 372 on the guide cylinders 368 lie in the same vertical plane. Thus, when the member 357 is shifted into face-to-face relation with the wire guide 301 (as shown in Fig. 23), when a blank 125 is wrapped around the mandrel 285 with its adjacent edges overlapping the wire guide 301, there are two thicknesses of paper disposed between the wire guide 301 and the member 357 and these thicknesses of paper have waves 380 formed therein by the cylinders 368.

An opportunity is thus provided for a straight length 381 of fine wire to be driven rectilinearly into the lower end of the guide groove 303 so as to cause this wire to pass upwardly throughout the entire length of this groove with said wire penetrating each paper wave 380 at two points and passing through and being guided by the cylinder groove 372 located between these points.

The wire straightening and feeding device 355 (Figs. 3, 15, 17 and 18) includes a body 382 opposite ends of which rest upon and are secured to main frame cross bars 53 and 54. The body 382 has a wide channel 383 in its upper surface, forming low walls 384 at its opposite edges. A hole 385 extends downwardly through the body 382 at the upper end of channel 383. Horizontal apertures 386, 387 and 388 are formed in body 382, the latter two being coaxially aligned on opposite sides of the hole 385 and having ball bearings 389 and 390 mounted therein. The aperture 386 has ball bearings 391 and 392 and a unidirectional clutch 393 mounted therein. Journalling in the bearings 391 and 392 and extending through clutch 393 so that its rotation is governed thereby is a shaft 398 having a drive gear 399 fixed on one end thereof and a uni-directional clutch 400 keyed to the other end thereof and secured in place by a set collar 401. Fixed on the clutch 400 is an actuating arm 402 the lower end of which is pivotally connected to one end of an adjustable connecting rod 403, the opposite end of which is pivotally connected to the lower end of main cam rocker 91 (Fig. 3).

Journalled in the bearings 389 and 390 is a shaft 404 which carries between said bearings a concentrically united roller 405 and gear 406 said roller having a shallow peripheral wire groove 407. The inner end of shaft 404 carries a driven pinion 408 which meshes with gear 399 (Fig. 15). Pivotally mounted at its lower end on the body 282 is an arm 415 which carries at its upper end a plate 416. The plate 416 has an aperture 417 through which extends a flanged bearing housing 418 which is secured by cap screws 419 to plate 416. Mounted in the housing 418 are ball bearings 420 in which a shaft 421 freely journals and one end of which extends from housing 418 opposite roller 405 and carries a combination roller 422 and gear 423 said roller lying in radial alignment with and rolling upon roller 405 while the gear 423 meshes with the gear 406 (Fig. 17). The roller 422 has a shallow peripheral wire guide groove 424 which lies in the same radial plane with the groove 407 in roller 405 so that said grooves meet in matching relation at the line of tangency between said rollers. The guide space thus subtended by said grooves at said line of tangency is in axial alignment with guide groove 303 provided in the fixed mandrel wire guide 301.

Secured to the inner face of main frame plate 46 (Fig. 2) is a bearing bar 430 which provides a front bearing for a shaft 431 carrying a crank handle 432. The inner end of shaft 431 journals in a suitable aperture provided in main frame plate 47. A pin 433 secured in an aperture in main frame plate 46 provides a limit stop for the clockwise rotation of crank handle 432. Fixed on shaft 431 (Fig. 3) is an arm 444 in the bifurcated extremity of which is pivotally mounted an apertured slide block 445 through which a threaded bolt 446 extends, this bolt having a nut 447 for confining a spring 448 between said nut and said slide block, said bolt screwing into a clevis 449 which pivotally connects with plate 416 of arm 415.

It is thus seen that by rotation of crank handle 432 to the position in which it is shown in Fig. 2, where it rests against stop 433, the arm 444 and bolt 446 are caused to operate as a toggle (Fig. 3) to swing arm 415 bringing rollers 405 and 422 into contact (as shown in Fig. 17). Rotating crank handle 432 in a counterclockwise direction breaks the toggle formed by arm 444 and bolt 446 and, when the head of said bolt is brought against the slide block 445 by action of spring 448, the further rotation of crank handle 432 withdraws roller 422 from contact with roller 405 thus allowing a wire to be fed between said rollers so that when the latter return into contact this wire may occupy the grooves 407 and 424 at the line of tangency between said rollers and be gripped and fed by said rollers.

Mounted in the channel 383 (Figs. 15 and 18) is a pair of bars 455 which are held in said channel by screws 456 extending through slots 457 in said bars and are held apart by springs 458 which are trapped in aligned apertures provided in opposing faces of said bars. A pair of adjustment screws 459 are screwed into threaded holes provided in each of the walls 384 to bear against the bars 455 and determine the relative locations of said bars in the channel 383 within the limits of movement allowed these bars by the slots 457 and the screws 456.

Each of the bars 455 has a series of screws 460 which are screwed downwardly into parallel rows of threaded holes provided therefor in said bars these screws carrying rollers 461 having peripheral wire-guiding grooves 462, which rollers are freely rotatable on screws 460 and lie in a given plane parallel with the bottom face 463 of the channel 383.

The grooves 462 lie in a plane containing the axis of guide groove 303 and the bars 455 are so adjusted by manipulation of the screws 459 that the space defined by opposing portions of the grooves 462 of the two rows of rollers 461 is disposed coaxially with said guide groove 303.

Fixed on the lower end of the body 382 is a bracket 464 carrying two pairs of opposed rollers 465 which are peripherally grooved and disposed in opposed relation in a vertical plane so that the grooves thereof subtend a space which is in coaxial alignment with the space subtended by the grooves 462 of the rollers 461. The bracket 464 also provides a mounting for a relatively large diameter guide pulley 470 having a deep peripheral groove 471 the bottom portion of which is substantially in coaxial alignment with the space subtended by the peripheral grooves of rollers 465.

Fixed on main frame plate 46 is a stub shaft 472 carrying a deeply grooved guide pulley 473, the pulleys 473 and 470 cooperating to guide a wire 474 travelling in the direction of arrow 475 from a source of supply (not shown) which maintains said wire under suitable tension as it is fed to pulley 473 so that said wire passes from the latter pulley to the pulley 470 and from this through the space subtended by the peripheral grooves of rollers 465; and thence through the space subtended by the peripheral grooves 462 of rollers 461; and thence through the space subtended by the grooves 407 and 424 of rollers 405 and 422 at their line of tangency, the latter grooves being sufficiently shallow so that the wire is gripped by said rollers and propelled along its axis as it passes therebetween.

The wire cut-off device 356 (Figs. 3, 4, 15 and 16) includes a block 486 which is secured to the upper end of body 382 by cap screws 478 on opposite sides of hole 385. The block 486 is bored to receive a wire guide nozzle 488 the upper end of which is substantially flush with the block 486 and is hardened so as to form a die for the cutting of a wire extending through an aperture formed axially therein. The nozzle 488 is located coaxially with the guide groove 303 of the mandrel wire guide 301 and has an inner tapered nose 489 which extends between the rollers 405 and 422 to a point close to the line of tangency between said rollers (Figs. 3 and 15). The block 486 has a slot 495 extending transversely thereinto in a plane containing the axis of guide nozzle 488, said block being apertured in the same plane to receive a cutter pivot pin 496 which pivots a wire cutter 497 on said block. The pin 496 is clamped in place by a cap screw 498 which extends freely through a hole in the block above slot 495 and is screwed into a threaded continuation of said hole below said slot. The cutter 497 is provided with a cutting edge 499 which is normally disposed just above the axial aperture of the wire guide nozzle 488.

Secured to a bottom face of main frame cross bar 53 (Fig. 4) is a bearing block 500 in which a short shaft 501 journals, opposite ends of this shaft having arms 502 and 503 fixed thereon. The outer extremity of wire cutter 497 is pivotally connected to an adjustable link 504 the opposite end of which is pivotally connected to arm 502. One end of an adjustable connecting rod 505 is pivotally connected to arm 503 while the opposite end of said rod is pivotally connected to the lower end of main cam rocker 94.

It is thus seen that a rocking of rocker 94 by main cam

E causes a rocking of shaft 501 which is transmitted through link 504 to the wire cutter 497 and causes this to move the cutting edge 499 thereof downwardly across the axial aperture of wire guide nozzle 488 so as to sever a wire extending outwardly through said aperture.

It is also believed clear, at this point in the description, that the clockwise rocking of the rocker 91 (Fig. 3) swings the arm 402 so as to rock the shaft 398 and the gear 399 mounted thereon thereby spinning the pinion 408 and the rollers 405 and 422. The great difference between the diameters of the gear 399 and pinion 408 causes this rotation of said rollers to draw a substantial length of the wire 474 into the mechanism 355 and to drive this wire through the nozzle 488 and out of the upper end thereof into the wire guide groove 303 in mandrel wire guide member 301. In fact the mechanism 355 is so designed that a single rocking of arm 402 by the main cam B thus feeds into guide groove 303 a sufficient length of wire for this to extend through the full length of said groove and approximately an inch out of the upper end thereof. The length of wire thus fed, and heretofore designated by the numeral 381, is so fed only at a time when the mandrel 285 has a paper blank 125 wrapped therearound with the material of the blank compressed between the member 354 and wire guide member 301 of the forming mandrel as shown in Fig. 23. Thus the length of wire 381 passes through all of the waves 380 formed in the material of the blank and is then cut off by the actuation of the wire cutter 497 and left embodied with the plant cover 62.

COVER TIP COMPACTING AND FINISHED COVER REMOVING MECHANISM 42

This mechanism includes an oscillating frame 508 carried on a shaft 510 which is journalled in bearings 511 mounted on inner faces of main frame plates 46 and 47 at the opposite ends of these plates from the power mechanism 37.

Fixed on one end of the shaft 510 is an arm 512 the free end of which pivotally connects with a pitman rod 513 which is adjustable in length and extends at its opposite end through a slide block 514 to bring a collar 515 fixed on said rod against said block, the extending end of said rod carrying an expansion spring 516 and a nut 517. The block 514 is united with an extension plate 518 which is pivotally connected to the free end of the arm 70 mounted on the main power mechanism cam shaft 67 (Figs. 1, 2 and 28). Thus the rotation of shaft 67 causes a rocking of the arm 512, the shaft 510 and the frame 508 fixed thereon between the positions in which they are shown in Figs. 2 and 28.

Frame 508 includes a pair of arms 523 and 524, which are fixed on shaft 510 and the extremities of which are joined by a bar 525. Frame 508 lies substantially in the same axial plane with the arm 512. The arm 524 lies in a radial plane relative to shaft 510, whereas the arm 523 has a double bend to bring the extremity thereof inwardly over the frame plate 47. Mounted on the inside faces of the arms 523 and 524, close to the cross-bar 525, are bearings 526 and 527 in which journal cylindrical end portions 528 and 529 of a square shaft 530. Extending through an aperture in square shaft 530 in the central vertical axial plane of the mandrel 285 is a threaded rod 531 which is secured to said shaft by suitable nuts on said rod, the latter supporting at its inner end a frusto-conical concave cover-shaping die 532.

Fixed to upper and lower faces of the square shaft 530 as by cap screws 533 are an upper vacuum cup mounting arm 534 and two lower vacuum cup mounting arms 535 and 536. Mounted on the ends of these arms to extend inwardly therefrom are vacuum cups 537 which are connected by tubes 538 to fittings 539 which screw into threaded holes provided in the square shaft 530 and thus connect with a hole bored axially inwardly through the cylindrical shaft end 528 so that tubes 538 thus connect with a vacuum connector 540 which is rotatably mounted on shaft end 528. The connector 540 is connected by a tube 541 with a fitting 542 which is screwed into a threaded hole provided in the extending end portion 543 of shaft 510 which has an axial bore connecting with said fitting. Shaft end 543 also rotatably receives a vacuum connector 544 which has a sealed connection therewith and thus with the fitting 542. The tube 124 extends from the valve 106 along the inner face of main frame plate 47 and outwardly under said plate and upwardly to where said tube connects with vacuum connector 544 (Fig. 1).

The arm 524 has a lug 555 welded thereon and extending laterally therefrom, said lug having a threaded aperture for receiving an adjustment stop screw 556. Mounted on the cylindrical end portion 529 of shaft 530 where this extends outwardly through bearing 527 is a pinion sprocket 557 which is in radial alignment with a large sprocket 558 freely rotatable on shaft 510, and is connected with said sprocket by an endless chain 559 including a tensioning turnbuckle 560. Fixed on the sprocket 557 is a stop-limit arm 565, anticlockwise rotation of which with shaft 530 is adapted to be precisely limited by engagement of said arm with stop-screw 556.

Extending laterally from sprocket 558 is a crank-post 566. Fixed to main frame plate 46 is a bar 567 carrying a post 568. Pivoted at its opposite ends on the posts 566 and 568 is a resilient control link 569. This has a frame 570 including parallel bars 571 which are united in spaced parallel relation by bearing block 572, which pivots on a pin 573 extending outwardly from post 568, and by slide blocks 574 and 575. Extending slidably through slide blocks 574 and 575 is a shaft 580, the outer end of which pivotally connects with the sprocket crank post 566, said shaft carrying set collars 581, 582 and 583, a coiled expansion spring 584 disposed between slide block 575 and set collar 581, and a coiled expansion spring 585 which is disposed between slide block 574 and set collar 582.

The resilient control link 569 and the adjustable stop screw 556 are so adjusted that, as the rotation of the shaft 67 and arm 70 causes the shaft 510 and the frame 508 fixed thereon to rock between the positions, shown in Fig. 2 and Fig. 28, the stop-limit arm 565 will be rocked in a counterclockwise direction into engagement with the screw 556 as the frame 508 swings towards the position in which it is shown in Fig. 2. This swinging of the arm 565 results from a counterclockwise bias imposed by the resilient arm 569 on the sprocket 558 during the final portion of the rightward swinging of the frame 508. This results in rotating square shaft 530 to locate the vacuum cup supporting arms 534, 535 and 536, to position vacuum cups 537 in light contact with a plant cover 62 which has just been formed on the mandrel 285 as shown in Fig. 2. Simultaneously with thus positioning the vacuum cups 535 in contact with finished plant cover 62, the concave die 532 is moved axially into cover tip compressing relation with the truncated tip of mandrel 285 as shown in Fig. 32.

This collapses the paper and wire included in the tip portion of finished plant cover 62 to produce a radial wall 583 of the material thus compacted which closes the upper end of said plant cover.

Operation

A detailed description of the method of the invention and a complete operation cycle of the machine 35 thereof follows.

As above stated, the full-line illustrations, with few exceptions, show the various elements of the machine 35 in what has been referred to as "zero position." Thus the main cams A, B, C, D, E and F and their respective cam follower rollers 79 to 84 inclusive are shown, in Figs. 5 to 10 inclusive, in full lines, in their zero positions. In the operation of machine 35 these cams rotate and their cam follower rollers merely swing back and forth short distances from shaft 67, and at fixed radii from the rocker shaft 77. Each cycle of operation of machine 35, in which a single plant cover 62 is completely formed and discharged therefrom, is accomplished by one rotation of cam shaft 67. To simplify the description of those functions of machine 35 performed by the shifting of the cam follower rollers 79 to 85 inclusive from one to another of various critical positions of said rollers relative to their respective cams, these cams are shown in only one position, their zero position (Figs. 5-10 inclusive). The various relationships which the cam followers have with their respective cams, at said certain critical points in the operation of machine 35, are indicated by broken lines and the angular relation thereof with zero position indicated in degrees.

Before describing these critical relationships, let us note the mechanism actuated by each of the main power cams and the status of that mechanism at zero position.

Cam A (Figs. 1 and 5) actuates the wire guide and wave-forming device 354 and in zero position the member 357 has just been retracted away from the mandrel 285 as shown in Fig. 2.

Cam B (Figs. 1, 3 and 6) actuates the wire straightening and feed device 355 (Figs. 3 and 15) and in zero position the arm 402 (Fig. 3) is idling through its anticlockwise return rotation about shaft 398 to starting position. Having reached starting position, arm 402 halts in readiness to actuate device 355 when it is later given a clockwise rotation.

Cam C (Figs. 1, 3 and 7) rotates the blank pickup arm 266 (Figs. 1, 2, 3, 19, 21, 26 and 27) and in zero position this arm overlies blank magazine 38 as shown in Fig. 1.

Cam D (Figs. 1, 3 and 8) raises and lowers the bearing block 253 (Figs. 1, 2, 3, and 21) which carries shaft 260 and blank pickup arm 266 mounted thereon. In zero position block 253 is lowered with the vacuum cups 275-279 inclusive brought to rest on the uppermost blank 125 in the blank magazine 38 and with the arm 266 occupying the recess 251 of the arm rest 247 (Fig. 21).

Cam E (Figs. 1, 4, and 9) actuates the wire cut-off device 356 (Figs. 4, 15 and 16) and in zero position the wire cutter 497 (Fig. 16) has just completed a wire-cutting operation and has resumed its normal retracted position.

Cam F (Figs. 1, 4 and 10) actuates the plant cover rotating nozzle 314 and in zero position the latter is in its terminal position in that end of slot 304 in which it is shown in full lines in Figs. 3 and 4.

Cam G (Fig. 11) actuates valve 104 (Figs. 1 and 11) which controls the suction of air from cover rotating nozzle 314 (Figs. 3 and 4) and at zero position this valve is shut, and pipe 122 leading to said nozzle is opened by said valve to the atmosphere.

Cam H (Fig. 12) actuates vacuum valve 105 (Fig. 1) which controls the suction of air from blank pickup arm 266, and at zero position this valve has just opened, thus causing vacuum cups 275-279 inclusive to suctionally grip the uppermost blank 125 on which said cups are resting.

Cam I (Fig. 13) actuates vacuum valve 106 which controls the suction of air from vacuum cups 535 of the cover tip compacting and finished cover removing mechanism 42. In zero position, this valve has been opened for a short period so as to set up a substantial suction in the cups 535 as they come into suctional engagement externally with the finished plant cover 62 on the mandrel 285 (Figs. 1 and 2).

The crank 70 (Figs. 1 and 2), mounted on cam shaft 67, actuates the cover tip compacting and finished cover removing mechanism 42 and at zero position the latter mechanism is positioned as shown in Figs. 1, 2 and 32.

Coiled contractile wire springs are provided in the machine 35 to maintain the cam followers 79-84 respectively in constant contact with cams A-F inclusive, but for simplification, the drawings omit any showing of these springs. It has been found preferable to make certain of the cams A-F inclusive of the double-faced groove type so that the cam follower is compelled by the groove to constantly follow its prescribed path. This practice has been found particularly preferable in the construction of cam C so as to assure positive rotation of the blank pickup arm 266 which is highly desirable to prevent collision between this arm and the cover tip compacting and finished cover removing mechanism 42.

Before starting the motor 63 which operates the machine 35, the magazine 38 is, of course, charged with a loaded tray 238 containing a full stack 137 of cover blanks 125 as shown in Figs. 19 and 21. Before inserting the loaded tray 238 in the magazine 38, the platform 195 is placed in its lowermost position (Figs. 19 and 21) by seizing the handle 225 of cam 222 and rotating this cam in a clockwise direction until the low point on the cam periphery comes beneath the roller 210, as shown in Fig. 19. After the loaded tray 238 has been slid into place resting on the frame 138 and with the lug 246 extending under the hold-down lug 151, the clamp bar 154 is swung upwardly opposite the tray 238 and the thumb screw 155 screwed into place, as shown in Fig. 21, to clamp the loaded tray against the main frame plate 47.

The shaft 172 is now shifted upwardly in the slide block 170, rotated 90° to bring roller 178 over the blank stack 137, and is then allowed to respond to the spring 174 to return switch base 173 to rest on block 170 and to hold roller 178 pressed downwardly against the uppermost blank in the stack. The pressure of the stack against roller 178 will thus rotate the arm 177 and open switch 180 causing the magnetic clutch 230 to be spring-opened thereby disengaging the drive connection between shaft 67 and blank stack elevating mechanism 185.

The rods 158 and 158' of the needle devices 156 and 168 are now lifted and swung to bring the needles 163 and 163' over the uppermost blank in the stack 137, after which the springs 159 are allowed to expand to yieldably press these needles downwardly against the stack. The function of these needles is to assist in the separation of the upper blank 125 from the blanks thereunder when said upper blank is suctionally engaged and lifted from the stack by the suction cups 275-279 inclusive.

Before starting the machine 35, the wire 474 must be fed around the pulleys 473 and 470 and through the wire straightening and feeding mechanism 355, as previously described, so that the leading end of this wire is flush with the upper face of the guide nozzle 488 of the wire cut-off device 356.

A cover stack receiving post 590 (Fig. 28) having a suitable base 591 for supporting the same in upright position is located on the floor, on which the machine 35 rests, in a suitable position to receive a stack 593 of finished plant covers from the cover removing mechanism 42.

The suction pump to which the vacuum supply pipe 121 is connected is started so as to maintain a semi-vacuum in the manifold 120. To place machine 35 in operation, the motor for the blower unit 353 and the main drive motor 63 are now started.

A complete cycle of operation resulting in the manufacture and delivery from the machine 35 of a complete plant cover 62 will now be described by reference to successive angular points in the single rotation of cam shaft 67 which takes place during said cycle. Particular reference will be made to Figs. 5-10 inclusive in this description and the critical relationships produced between each of the main operating cams A-F inclusive and its cam follower roller during this cycle will be described in the sequence in which they occur.

Bearing in mind that the shaft 67 and all of the elements mounted thereon including cams A-F, inclusive, and crank 70, rotate in a counterclockwise direction (as viewed in the drawings) the first action of the cycle occurs within the first 15° of rotation of shaft 67 when cam D (Fig. 8) actuates cam follower 82 to lift bearing block 253 of the individual blank delivery mechanism 39 which, of course, lifts the vacuum pickup and delivery arm 266 (Figs. 1, 2, 19 and 21) from the position in which said arm is shown in these figures, wherein the vaccum cups 275–279 are suctionally gripping the uppermost blank 125 of the blank stack 137 in the magazine 38, so as to lift this upper blank from said stack as the arm 266 rises. This vertical movement of the bearing block 253 is sufficient to raise the arm 266 to a level above the lower stops 250 of the arm rests 247 and 248.

It is to be noted, by reference to Fig. 1, that the vacuum cups carried by blank pickup arm 266 are located along the axis of symmetry 131 and over the half-portion 135 of the blank 125 just picked up from the stack 137. The half-portion 136 of said blank is thus unsupported except by its connection with the half-portion 135 and sags into contact with the next uppermost blank on the stack 137. When a blank 125 is thus lifted from the stack 137, the light material of this blank readily tears away from needles 163 and 163' while the latter remain in place, pinning down the other blanks in the stack.

Rotating from 15° to 90° from zero position, cam C (Figs. 1, 3 and 7) swings the blank pickup arm 266 horizontally through an arc of 90° to a position over mandrel 285, as shown in broken lines in the upper portion of Fig. 26 in which it is to be noted that the blank half 135 is still supported by the pickup arm 266 in horizontal position and the blank half 136 trails outwardly and downwardly while the arm 266 is moving horizontally.

Cam D maintains arm 266 in its elevated position and lowers this arm just following its arrival over the mandrel 285, as shown in full lines in Fig. 26, to compress the blank 125 carried thereby between the vacuum cups 275 and 276 and the mandrel and with the axis of symmetry 131 of blank 125 coinciding with the horizontal rectilinear element 286 of the external surface of the mandrel 285, as shown in broken lines 610 in Fig. 3. Blank half 136 now drapes itself by gravity about the rear half of mandrel 285 while blank half 135 remains horizontally supported by the vacuum in arm 266.

Arm 266, being elevated during its horizontal swinging movement, passes over the stop 250 of the arm rest 248 and engages the stop 249 of said arm rest as it completes said movement. Thus when arm 266 is lowered into its position 610 (Fig. 3) it is guided by the recess 251 of the arm rest 248.

During its rotation from 16° to 76° from zero position, cam F rotates the shaft 312 to return the cover rotating vacuum nozzle 314 from its terminal position, in which this is shown in Figs. 3 and 4 to its initial or starting position at the opposite end of the slot 304 in the mandrel 285.

The first half-revolution of crank arm 70 from zero position swings the finished plant cover removing mechanism 42 from the position in which this is shown in Figs. 1 and 2 to the position in which this is shown in Fig. 28. During approximately the first half of this half-revolution of the crank arm 70, the square shaft 530 (Figs. 1 and 2) of the mechanism 42 does not rotate relative to the frame 508 in which said shaft is rotatably mounted because the arm 565 is held against the adjustable stop screw 556 by the spring torque applied to the sprocket 558 by the spring control link 569. The vacuum cups 537 being in suctional engagement with the finished plant cover 62 on the mandrel 285, at the time mechanism 42 starts to swing anti-clockwise, this cover is withdrawn from the mandrel substantially in alignment with the axis of said mandrel. This swinging of the plant cover removing mechanism 42 to remove cover 62 from mandrel 285 is completed in time to free the space above said mandrel to receive the blank pickup arm 266 when the latter swings into place over said mandrel, as above described, carrying a blank 125.

As the first quarter-revolution from zero position of the crank 70 is completed, the swinging of the sprocket 558 with the rest of the mechanism 42 mounted on shaft 510 causes the set collar 583 on the shaft 580 to be brought into engagement with slide block 574 which terminates the application of spring torque by the link 569 to the sprocket 558 and causes this link to halt the rotation of the sprocket 558 with the balance of mechanism 42. With the sprocket 558 stationary, the second quarter-turn of the crank 70 from zero position produces, through the chain 559 and sprocket 557, a rotation of the square shaft 530 and the suction cup arms 534, 535, and 536, relative to the frame 508 on which said shaft is carried so as to swing said suction cup arms and the plant cover 62 gripped by the suction cups 537, into an approximately vertical postion as shown in Fig. 28 with the cover 62 disposed in alignment with and over the cover receiving post 590 and any stack 593 of covers which may previously have been delivered onto said post.

Cam I actuates vaccum valve 106 to admit atmospheric air to vacuum pipe 124 at about 117° from zero position so as to permit this air to reduce the suction with which the cover 62 is gripped by cups 537 sufficiently by the time mechanism 42 reaches the position in which this is shown in Fig. 28 so that the finished plant cover 62 will be released to gravitate downwardly onto the post 590 or stack 593, as the case may be, when the mechanism 42 starts its return movement.

The action of the control link 569 (Fig. 2) on the mechanism 42 during the return of the latter to zero position is just the reverse of that which took place during the opposite movement of said mechanism.

Thus shaft 530 and arm 565 are swung to bring the latter against the stop screw 556 and position the die 532 and vacuum cups 537 to perform their functions on the next plant cover 62 now being produced in the machine 35.

Getting back to the process of making said next plant cover 62 from the blank 125 just delivered over the mandrel 285 (Fig. 26), the lowering of the arm 266 by cam D to press this blank against the mandrel occurs as cam D rotates 115° from zero position.

The horizontal swinging of the pickup arm 266 has rotated arm 281 on the lower end of shaft 260, on which the pickup arm 266 is carried, to swing vertical pin 282, carried on arm 281, over the lever 343 (Fig. 14) so that with the lowering of arm 266 to press said blank against said mandrel (Fig. 26), finger 282 depresses lever 343 to open the butterfly valve 337 and thus connect the suction end of motor blower 353 with the suction chamber 329 provided within the mandrel 285. A semi-vacuum is thus immediately formed in said chamber, causing air to be sucked inwardly through the holes 305 formed in the mandrel shell 288 (Figs. 3, 4 and 14). This produces a semi-vacuum between the mandrel and the two halves 135 and 136 of the blank 125 which has just been delivered over the mandrel.

Hanging downwardly as shown in full lines in Fig. 26 at the time this suction starts, blank half 136 is immediately sucked inwardly by this suction and wrapped snugly around the rear half of mandrel 285 as shown by broken lines 615 in said figure.

Vacuum valve 105 is closed by cam H (Fig. 12) after the latter has rotated about 117° from zero position, thereby relaxing the vacuum in the pickup arm 266 and the vacuum cups mounted thereon by connecting these with the atmosphere. This occurs immediately following the lowering of the blank 125 and compressing this between vacuum cups 275 and 276 and the mandrel, and releases the suctional grip with which the other vacuum cups on arm 266 has been supporting blank half 135. This results, of course, in blank half 135 immediately gravitating downwardly as indicated by broken lines 616 in Fig. 26, so that the suction produced between the blank half 135 and the mandrel 285 rapidly wraps this half of the blank about the front portion of the mandrel 285. This consecutive action of the suction on the blank halves 136 and 135 results in radial edge portion 127 of blank half 135 being brought into overlapping relation with radial edge portion 128 of blank half 136 (Fig. 27) with these edge portions disposed in symmetric relation with and overlying wire guide groove 303 of mandrel 285.

Adequate overlapping of blank edge portions 127 and 128 is assured by the magazine 38 being spaced from the axis of rotation of the blank pickup arm 266 so that when a blank 125 is delivered by the latter over and pressed against the mandrel 285, the point where the axis of symmetry 131 of said blank intersects the notch 126 thereof lies at the intersection of the axis of said mandrel and the horizontal rectilinear element 286 of its outer surface. Thus when the two halves of the blank are sucked into overlapping relation about mandrel 285 there is a substantial marginal width of material included in the overlapping edge portions 127 and 128 throughout their length.

This factor also results in the cover 62 having a closed pointed conical apex when said edge portions are stitched together in the wire stitching operation immediately following.

The member 357 of the wire guide and wave-forming device 354 remains retracted away from the mandrel 285 as shown in Fig. 2 for the first 145° that cam A rotates from zero position. The rotation of this cam from 145° to 180° from zero position, however, swings member 357 to clamp overlapping edge portions 127 and 128 of the blank 125, just wrapped around mandrel 285, against the fixed wire guide and wave forming element 301 (Fig. 23) so as to form a series of waves 380 in said overlapping blank edge portions in preparation for the stitching of these together. The motion just described of member 357 takes place while the blank 125 enfolding the mandrel 285 is also still held positively in oriented relation with said mandrel by the compression of said blank against said mandrel by vacuum cups 275 and 276. Immediately following the clamping action of member 357, however, and at 190° from zero position, cam D lifts blank delivery arm 266 out of engagement with the blank on said mandrel, as shown by broken lines 620 in Fig. 27 and shortly thereafter cam C (Fig. 7), rotating from 196° to 270° from zero position, swings arm 266 horizontally 90° back to its position over blank magazine 38 as shown in Fig. 1.

As soon as the member 357 moves into clamping relation with blank edge portions 127 and 128 (as shown in Figs. 23 and 24), which takes place at 180° from zero position, cam B (Fig. 6) rotating from 183° to 215° from zero position swings arm 402 of wire feeding mechanism 355 clockwise through a short rapid oscillation about shaft 393 which motion is transmitted through uni-directional clutch 400 to shaft 398 and gear 399 mounted thereon. Rotation of this gear is compounded and transmitted to the shaft 404 through pinion 408 which meshes with said gear (Figs. 3 and 15). This drives the wire-feed rollers 405 and 422 so as to straighten and propel from mechanism 355 a length 381 of the wire 474 and project this into the wire guide groove 303 of wire guide 301. As previously described, because of the character and location of the guide cylinders 368, the wire length 381 thus projected into guide groove 303 is propelled throughout the length of said groove and outwardly at the upper end thereof with said wire piercing each of the waves 380 formed by the cylinders 368 in the overlapping blank edge portions 127 and 128. The length of wire 381 thus stitches together the overlapping blank edges and provides a rectilinear reinforcement for the plant cover 62 thus produced from the blank 125.

It should be noted here that when cam D lifts blank delivery arm 266 (at about 190° from zero position) the finger 282 is lifted from depressing contact with lever 343 thus permitting the spring (not shown), which biases the valve shaft 338 toward closed position, to close valve 337 thereby shutting off the connection between the suction end of blower 353 and the suction chamber 329 of the mandrel 285. With the closing of valve 337 while the mandrel 285 is completely covered by a newly formed plant cover 62 substantially closing holes 305 in the mandrel, the only passageways freely connecting the vacuum chamber 329 with the atmosphere are the holes 335 formed in suction pipe 344. These holes, while too small to interfere with forming a partial vacuum in mandrel chamber 329 when valve 337 is open, function, when said valve closes, to admit the atmosphere rapidly enough into the chamber 329 to raise the pressure therein to atmospheric, and thus free the plant cover 62 on said mandrel for the next step of its being partially rotated on said mandrel.

Rotating from 213° to 225° from zero position, cam E (Figs. 1 and 9) actuates the wire cutter 497 (Figs. 15 and 16) to cut off the length of wire 381 (Figs. 23 and 24) with which adjacent edges of the blank 125 on mandrel 285 have just been stitched together. At 247° from zero position cam E restores wire cutter 497 to its normal position shown in Fig. 16.

Rotating between 215° and 230° from zero position, cam A withdraws clamping member 357 from its clamping position shown in Fig. 23 to a partially retracted position out of contact with cover 62.

At 180° from zero position, cam G (Fig. 11) opens vacuum valve 104 to cause air to be exhausted through pipe 122 (Fig. 1) and hose 322 (Fig. 4) from hollow shaft 312 and cover rotating nozzle 314 mounted thereon. The partly completed cover 62 which is wrapped around mandrel 285 at this time rests against the vacuum cup 315 provided on the end of nozzle 314 so that the evacuation of air from the latter causes this nozzle to suctionally engage the paper of the cover. It is to be recalled that nozzle 314 at this time is disposed in the opposite end of slot 304 than the end of this slot in which said nozzle is shown in Figs. 3 and 4. The nozzle 314 is thus in its initial or starting position for the partial rotation which it is adapted to give to the partially formed cover 62 on the mandrel 285.

Rotating from 227° to 270° from zero position, cam F (Figs. 4 and 10) swings arm 326 to rotate hollow shaft 312 and nozzle 314 through an arc of 180° thus bringing nozzle 314 to the position in which this is shown in Figs. 4 and 14, and swinging the cover 62 so that the seam formed by wire length 381 directly overlies the horizontal rectilinear element 286 of the mandrel 285 (Fig. 4).

Rotating from 275° to 290° from zero position, cam D lowers blank pickup arm 266 to bring the vacuum cups carried thereby to rest on the next upper blank 125 in magazine 38.

Rotating from 230° to 280° from zero position, cam A (Figs. 1 and 5) actuates the wire guide and wave forming device 354 to return the member 357 into clamping relation with the single thickness of paper of the newly formed plant cover 62 which now overlies wire guide 301 of the mandrel 285 (Figs. 23 and 24) with the consequence that waves are formed in said single thickness of paper similar to the waves 380 shown in Fig. 23.

Rotating from 283° to 313° from zero position, cam B (Figs. 1, 3 and 6) again actuates the wire straightening and feeding mechanism 355 to feed another length of wire identical to length 381 and to drive said length of wire through the waves now formed in the single thickness of paper of the newly formed plant cover 62 thereby forming a second rectilinear reinforcement in said plant cover along a line diametrically opposite the seam produced by the stitching together of overlapping edges of the cover blank by wire length 381.

Rotating from 313° to 325° from zero position, cam E (Figs. 1, 3 and 9) actuates the wire cutter 497 (Fig. 16) to cut off the projected length of wire forming the second reinforcement of the newly formed plant cover 62 and then returns said cutter to initial position.

Rotating from 313° to zero position, cam B returns the wire feeding arm 402 approximately to its initial starting position (the latter being reached in the first 30° of rotation of this cam in the next following cycle).

Rotating between 315° and 345° from zero position, cam A (Figs. 1 and 5) shifts clamping arm 357 from its clamping position shown in Fig. 23 to its retracted position shown in Fig. 2.

Rotating between 323° and 328°, cam F (Figs. 1, 4 and 10) rotates nozzle 314 through an angle of approximately 5° to further rotate newly formed plant cover 62 so as to displace the second wire stitching reinforcement from over the notches 302 in wire guide 301 so as to facilitate the removal of the newly formed plant cover 62 from the mandrel 285.

At 320° from zero position, cam I (Fig. 13) actuates vacuum valve 106 (Fig. 1) causing the evacuation of air through pipe 124, connector 544, shaft end 543, fitting 542, pipe 541, connector 540, shaft end 628, fitting 539 and tubes 538 from vacuum cups 537. Thus the latter vacuum cups become conditioned to suctionally engage the newly formed plant cover 62 resting on the mandrel 285 when the cover tip compacting and cover delivery mechanism 42 reaches its zero position (Figs. 1 and 2).

At 330° from zero position, cam G (Fig. 11) closes vacuum valve 104 (Fig. 1) and opens vacuum pipe 122 to the atmosphere thereby restoring atmospheric pressure in the plant cover rotating suction cup 315 (Figs. 3 and 4).

At 345° from zero position, cam H (Fig. 12) opens vacuum valve 105 (Fig. 1) causing air to be evacuated through pipe 123, and flexible tube 269 from blank pickup arm 266 thereby causing the suction cups mounted on said arm and resting on the uppermost blank 125 in magazine 38 to suctionally engage said blank.

As the tip compacting and finished cover removing mechanism 42 approaches its zero position (shown in Figs. 1, 2 and 32), the die 532 compresses the pointed tip portion of the newly formed plant cover 62, as shown in the latter figure to form a radial wall 583 of the wire and paper thus compacted, which wall closes the upper end of said plant cover.

This completes the description of a single cycle of operation of machine 35 which results in the complete manufacture of another plant cover 62 which, at the end of the cycle, awaits its withdrawal from the mandrel 285, in the same position (shown in Figs. 1 and 2) as that occupied at the beginning of said cycle by the cover 62 last previously made.

The machine 35 operates continuously to repeat the above described production cycle, the only shut-downs required being to replace an empty black stack tray with a full one.

Various means may be employed for receiving finished plant covers 62 for mechanism 42 and conveying these to a place where they may have the final step performed of bending outwardly the anchor flange tabs 130, and be packaged for shipment. A continuously moving belt conveyor may be employed for this purpose, but to simplify the disclosure, the collection of covers 62 on a stationary post with periodic removal of small stacks 593 of these, is shown in the drawings.

Each such stack 593 when removed from post 590, is dropped over a frusto-conical form 700 which is truncated at 701 so as not to disturb the wire-and-paper tip walls 583 of the covers 62 when the latter are pressed downward on said form.

The base 702 of form 700 provides an annular ledge 703 extending outwardly therefrom, on which the tabs 130 of the covers 62 in said stack come to rest, as shown in Fig. 29.

A complementary conical bell 704 having a handle 705 is now pressed downward over cover stack 593 and the latter compressed between this bell and form 700 as shown in Fig. 30. This produces an annular crimp in the covers just above the tabs 130 which causes the latter to extend radially outward and upward. The bell is then removed from the stack and the latter removed from form 700 for nesting with other such stacks in a fibreboard shipping tube. The appearance of cover stack 593, when thus ready for packaging, is shown in Fig. 31.

Although a particular preferred embodiment of the invention was adopted as a basis for the disclosure of said invention herein, it is to be understood that this embodiment is susceptible of being widely modified without departing from the spirit of the invention or the scope of the appended claims.

The claims are:

1. In a machine for making conical plant covers, the combination of: a conical mandrel having a foraminous conical surface and closed at its base to form a vacuum chamber therein, means for delivering a substantially semi-circular paper blank into contact with the conical surface of said mandrel and in symmetrical relation with a vertical plane containing the axis of said mandrel, and holding said blank in said position by pressing said blank against said mandrel along the adjacent line where said plane intersects said conical surface; means for imposing a vacuum on said chamber to suck air through said conical surface and thereby wrap said blank about said mandrel whereby adjacent edges of said blank are brought into overlapping relation; a wire stitcher which inserts a wire in and out through said overlapping blank edges so that said wire extends from the apex to the base of said cover; means for rotating said cover without removing the same from said mandrel; means for actuating said stitcher mechanism the second time while said plant cover is on said mandrel to introduce a second wire in a different portion of said plant cover to provide an additional reinforcement to said cover; means for successively removing plant covers thus formed on said mandrel and stacking the same; and means coordinately actuating the aforesaid means in timed sequence to repeatedly form and stack conical plant covers.

2. A combination as in claim 1 in which said cover rotating means includes a vacuum cup disposed within said mandrel and rotatable about the axis thereof, means for the timely creation of a vacuum in said cup to cause the same to adhere to said cover, means for then rotating said cup and said cover about the axis of said mandrel without rotating said mandrel and means for braking said vacuum in said cup at the conclusion of said rotation, thereby permitting said cover to be removed from said mandrel when said cover is completed.

3. In a machine for making conical plant covers, the combination of: a conical mandrel; means for applying a paper blank to said mandrel in conformation with the outer surface of the latter and with adjacent edges of the blank so applied in overlapping relation; wire stitching means associated with said mandrel for uniting said overlapping blank edges so that said wire extends from apex to the base of said cover; and means for rotating said cover without removing the latter from said mandrel to permit a second stitching operation of like character to be performed by the same stitching means on a different portion of said cover.

4. A combination as in claim 3 in which said mandrel remains stationary during the rotation of said cover and in which said cover rotating means grips said cover and rotates the latter freely on said mandrel.

5. A combination as in claim 4 in which said cover rotating means includes a vacuum cup disposed within said mandrel with the mouth thereof open outwardly substantially flush with the surface of said mandrel; and means rotatably mounted coaxially with said mandrel for supporting said cup and creating a vacuum in the mouth thereof and partially rotating said cup about the axis of said mandrel to effect a partial rotation of the plant cover when the latter is gripped by suctional action of the cup on said cover.

6. In a machine for making conical plant covers, a combination of: a conical mandrel having a foraminous conical surface and closed at its base to form a vacuum chamber therein, means for supporting said mandrel in a fixed position with a rectilinear element of the conical surface thereof disposed horizontally, and with the mandrel disposed downwardly therefrom; magazine means for supporting a stack of substantially semi-circular paper blanks with the uppermost blank approximately on the same level as said rectilinear element, suction cup means pivotally mounted for horizontal rotation about a vertical axis located at the intersection of vertical planes containing respectively the axes of symmetry of said blanks and said rectilinear element; means for oscillating said suction cup means horizontally between an initial position in which it overlies a portion of the uppermost blank in said magazine located between the axis of symmetry of said blank and said mandrel, and a second position in which said suction cup means overlies said rectilinear element of said mandrel and the space on the opposite side of said element from said blank magazine; means for elevating said suction cup means to allow it to travel between said two positions and lowering the same when it arrives at either one of said two positions; means for withdrawing air from said mandrel vacuum chamber to cause air to be sucked inwardly through the openings in the conical surface of said mandrel; means for imposing a suction on said suction cup means; and means for coordinately actuating the aforesaid means repeatedly in the following cycle, lowering said suction cup means onto the uppermost blank in said magazine with said means in its first position, applying a suction to said means to cause it to suctionally engage said uppermost blank along the axis of symmetry thereof and in the area between said axis of symmetry and said mandrel, lifting said suction cup means with the blank engaged thereby, swinging said suction cup means horizontally carrying said blank into its second position over said mandrel, lowering said suction cup means and the portion of the blank engaged thereby to bring the axis of symmetry of said blank into substantial coincidence with said rectilinear element of said mandrel, the unsupported half of said blank gravitating downwardly at this time about one side of said mandrel, relaxing the suction in said suction cup means to allow the other half of said blank to gravitate downwardly, sucking air from said mandrel chamber and inwardly through said foraminous conical wall thereby wrapping said two halves of said blank successively about said mandrel whereby meeting edge portions of said blank are brought into overlapping relation.

7. A combination as in claim 6 in which means is provided for uniting said overlapping edge portions of said blank and in which the last-mentioned means is coordinately actuated by said coordinate operating means in timely relation with the other elements recited.

8. A combination as in claim 7 in which a reinforcement of said plant cover is produced by uniting said overlapping edges; and means for partially rotating said plant cover after said edges are united, said coordinately operating means actuating said cover rotating means and also actuating said edge uniting means a second time after said cover is so rotated to add a reinforcement to another portion of said cover.

9. A combination as in claim 8 in which means is provided for externally engaging said plant cover suctionally after it has been formed and withdrawing said plant cover axially from over said mandrel, said withdrawing means being operated in timely relation with the other means by said coordinately actuating means.

10. A combination as in claim 9 in which means is provided for collapsing the tip portion of the plant cover thus made to form a radial wall closing the tip of said cover said collapsing means being actuated by movement of said cover withdrawing means into suctional engagement with the cover.

11. A combination as in claim 9 in which said blank edge uniting means includes a means for forming waves in said overlapped edge portions and driving a straight piece of fine wire through said waves said wire thus providing a reinforcement of the plant cover both where it unites said edges and where it is applied in a different portion of the plant cover.

12. A method of forming a conical article with a closed apex from a blank approximately semi-circular in form, so as to have a diametral edge, on a mandrel substantially conforming to the shape of said article, said method comprising notching said blank adjacent the center of the diametral edge of said blank, placing said blank in contact with said mandrel in symmetrical relation with a plane which includes the axis of said mandrel, and with the bottom of said notch coinciding with said axis, wrapping portions of said blank located on opposite sides of said plane successively about the respectively adjacent portions of said mandrel to cause portions of said diametral edge of said blank disposed oppositely from said notch to be brought into overlapping relation while pressed against said mandrel, said edge portions meeting at the apex of said mandrel to form said conical article with a closed apex, and uniting said overlapping blank edge portions to consummate the formation of said article.

13. A method as recited in claim 12 in which said mandrel is positioned substantially beneath said blank when the latter is first applied thereto and in which said blank is of such a light, flexible material in proportion to the size of said blank, as to drape itself downwardly by its own weight, when unsupported, over upwardly exposed surfaces of said mandrel on opposite sides of said plane, said method including the steps of sucking air from the space between said mandrel and said blank to suck said opposite portions of said blank into conformity with said mandrel as aforesaid and supporting one of said opposite portions of said blank briefly in opposition to the action of said suction and then releasing said supported blank portion whereby the same is sucked by said suction into conformity with said mandrel in overlapping relation with the other opposite blank portion.

14. A method of forming a conical article in the form of a mandrel which comprises the steps of locating said mandrel with a rectilinear element in the surface thereof disposed approximately horizontally, forming a blank of relatively light thin material such as paper or the like with a shape which will cause said blank to fit around said mandrel and provide overlapping edges when properly applied to said mandrel, delivering said blank in substantially horizontal position over said mandrel to bring said blank into symmetrical relation with a vertical plane including the axis of said mandrel, pressing said blank against said mandrel along the line of intersection of said plane with said mandrel, supporting said blank on one side of said plane while allowing said blank on the other side of said plane to be unsupported, said blank being formed of such light material compared with the size thereof as to cause said unsupported portion of said blank to drape itself by gravity downwardly about the adjacent upwardly exposed portion of said mandrel, evacuating air from between said mandrel and said blank to produce a suction capable of sucking unsupported portions of said blank when disposed as aforesaid into conformity with said mandrel, and releasing the support from the aforesaid supported portion of said blank on one side of said plane a brief interval after the portion of said blank on the other side of said plane has been sucked into conformity with said mandrel whereby the temporarily supported portion of said blank is sucked into conformity with said mandrel in overlapping relation with the opposite portion of said blank, and uniting the overlapping portions of said blank to complete the formation of said article.

References Cited in the file of this patent

UNITED STATES PATENTS

| | | |
|---|---|---|
| 1,147,276 | Southard | July 20, 1915 |
| 1,160,816 | Angell | Nov. 16, 1915 |
| 1,584,745 | Holman | May 18, 1926 |
| 2,104,535 | Barbiere | Jan. 4, 1938 |
| 2,133,681 | Higgins | Oct. 18, 1938 |
| 2,247,466 | Baker | July 1, 1941 |
| 2,437,792 | Schneider | Mar. 16, 1948 |
| 2,444,518 | Lewis | July 6, 1948 |
| 2,489,921 | Moore | Nov. 29, 1949 |
| 2,563,633 | Amberg | Aug. 7, 1951 |
| 2,648,842 | Shockey et al. | Aug. 18, 1953 |
| 2,703,514 | Thiem | Mar. 8, 1955 |
| 2,819,659 | Scott et al. | Jan. 14, 1958 |